(12) United States Patent
Karnik et al.

(10) Patent No.: US 11,334,880 B2
(45) Date of Patent: May 17, 2022

(54) METHODS AND SYSTEMS FOR ONLINE PURCHASE OF ITEMS IN INCREASED ONLINE TRAFFIC

(71) Applicant: MASTERCARD INTERNATIONAL INCORPORATED, Purchase, NY (US)

(72) Inventors: Ajit Karnik, Pune (IN); Naveen Kumar Gupta, Pune (IN); Lalit Manchanda, Gurgaon (IN); Ajay Sinha, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/941,209

(22) Filed: Jul. 28, 2020

(65) Prior Publication Data
US 2021/0065172 A1    Mar. 4, 2021

(30) Foreign Application Priority Data
Aug. 30, 2019    (SG) ............................. 10201908029T

(51) Int. Cl.
*G06Q 20/38*    (2012.01)
*H04L 9/30*     (2006.01)

(52) U.S. Cl.
CPC ....... *G06Q 20/3821* (2013.01); *G06Q 20/385* (2013.01); *G06Q 20/3829* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 2011/0093361 A1* | 4/2011 | Morales | G06Q 30/0603 705/26.62 |
| 2012/0041879 A1* | 2/2012 | Kim | G06Q 30/06 705/44 |
| 2013/0090959 A1* | 4/2013 | Kvamme | G06Q 10/02 705/5 |
| 2015/0088697 A1* | 3/2015 | Garnepudi | G06Q 30/0637 705/26.82 |

\* cited by examiner

*Primary Examiner* — Namrata Boveja
*Assistant Examiner* — Amit Patel
(74) *Attorney, Agent, or Firm* — Pillsbury Winthrop Shaw Pittman LLP

(57) ABSTRACT

A method may include receiving an online purchase request in a merchant interface from an electronic device of a customer. The online purchase request includes payment related information of payment card associated with customer for purchasing an item at a set price. Method includes sending an OTP request to payment server. Method further includes receiving an OTP from payment server, and storing OTP as a merchant OTP. Further, method includes facilitating sending OTP to registered contact identifier of customer. Further, method includes providing an option to customer to input a customer OTP in merchant interface. Thereafter, upon receipt of customer OTP from customer, the method includes locking an online purchase order of item for the set price based on one or more conditions. Payment transaction from payment card is actuated after a time period of locking the online purchase order based on the one or more conditions.

18 Claims, 15 Drawing Sheets

METHODS AND SYSTEMS FOR ONLINE PURCHASE OF ITEMS IN INCREASED ONLINE TRAFFIC

CROSS-REFERENCE TO RELATED APPLICATIONS

This application claims priority to Singaporean Application Serial No. 10201908029T, filed Aug. 30, 2019, which is incorporated herein by reference in its entirety.

TECHNICAL FIELD

The present disclosure relates to payment transactions and, more particularly to, methods and systems for facilitating online payment transactions when the online traffic is more than the usual online traffic or in cases when there is a discounted sale period going on with merchants.

BACKGROUND

In the present time of digital technology, online purchasing for goods/services have gained popularity among many customers. Customers purchase from an e-commerce site or online retailers (hereinafter referred to as 'merchant site') using computers or electronic devices sitting at their homes. The merchant site may accept digital payments for payment transactions of the goods/services purchased online by the customers. On many occasions, a typical merchant site may provide advertisements of the goods/services for sale. For instance, during sale seasons or festival seasons, many offers or discounts may be provided to attract old or new customers. In such scenarios, a greater number of customers are expected to visit or make purchases on the merchant site. Consequently, the higher number of customers presence on the merchant site causes increase in the online traffic associated with the merchant site and other components of the payment network.

The increase in online traffic may affect the overall time of payment transactions for customers. More specifically, the high customer traffic may overload the merchant site and other constituents of the payment network and slow down the entire payment transaction process. Consequently, the payment transactions may be delayed, timed-out, dropped-out or even failed due to the high traffic. This may affect the experiences of the customers. When a payment transaction for an online purchase order of a customer drops out, the online purchase order may not be further processed for the shipment. In such a scenario, the customer is not able to take benefit of the discounts offered during the sale period. Moreover, the customer may face issues, such as payment amount deducted but the online purchase order not being confirmed, purchase order out of stock due to incomplete payment, and/or the like. In such cases, the customer may not visit the merchant site in the future due to a negative experience. This may affect business and reputation of the merchant site.

Based on the foregoing, there exists a need to overcome the above-mentioned problems and facilitate a technique where the customers can utilize the benefits of discount offered in the sale period despite high online traffic. More specifically, there is need to improve customer experiences for online purchasing in the high online traffic.

SUMMARY

Various embodiments of the present disclosure provide systems and methods for providing payment transactions in high online traffic.

In an embodiment, a method includes receiving, by a server system, an online purchase request in a merchant interface from an electronic device associated with a customer. The online purchase request includes payment related information of a payment card associated with the customer for purchasing at least one item at a set price. The method further includes sending a One-Time Password (OTP) request to a payment server associated with a payment network. The method further includes receiving an OTP from the payment server, and storing the OTP as a merchant OTP in a database accessible to the server system. Further, the method includes facilitating sending the OTP to a registered contact identifier of the customer. Further, the method includes providing an option to the customer to input a customer OTP in the merchant interface. Thereafter, upon receipt of the customer OTP from the customer, the method includes locking an online purchase order of at least one item for the set price based on one or more conditions. A payment transaction from the payment card is actuated after a time period of locking the online purchase order based on the one or more conditions.

In another embodiment, a server system includes a memory comprising stored instructions, and a processor configured to execute the stored instructions to cause to server system to perform receiving an online purchase request in a merchant interface from an electronic device associated with a customer. The online purchase request includes payment related information of a payment card associated with the customer for purchasing at least one item at a set price. The server system is further caused to send a One-Time Password (OTP) request to a payment server associated with a payment network. The server system is further caused to receive an OTP from the payment server, and store the OTP as a merchant OTP in a database accessible to the server system. Further, the server system is caused to facilitate sending the OTP to a registered contact identifier of the customer. Further, the server system is caused to provide an option to the customer to input a customer OTP in the merchant interface. Thereafter, the server system is further caused to, upon receipt of the customer OTP from the customer, lock an online purchase order of at least one item for the set price based on one or more conditions. A payment transaction from the payment card is actuated after a time period of locking the online purchase order based on the one or more conditions.

In yet another embodiment, a method for a payment transaction for online purchase order in increased online traffic is disclosed. The method includes receiving, by a server system, an online purchase request in a merchant interface from an electronic device associated with a customer. The online purchase request includes payment related information of a payment card associated with the customer for purchasing at least one item at a set price. The method includes determining one of a current online traffic at the server system, and if there is a sale period associated with the at least one item. Upon the current online traffic being greater than a threshold traffic or upon occurrence of a sale period, the method includes sending a One-Time Password (OTP) request to a payment server associated with a payment network. Further, the method includes receiving an OTP from the payment server, and storing the OTP as a merchant OTP in a database accessible to the server system. The method further includes facilitating sending the OTP to a registered contact identifier of the customer. Further, the method includes providing an option to the customer to input a customer OTP in the merchant interface. Upon receipt of the customer OTP from the customer, the method includes locking an online purchase order of the at least one item for the set price based on one or more conditions. Thereafter, the method includes facilitating processing of a payment transaction from the payment card for the locked online purchase order after a time period of locking the online purchase order based on the one or more conditions, wherein processing of the payment transaction comprises validating the merchant OTP and the customer OTP provided as input by the customer.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
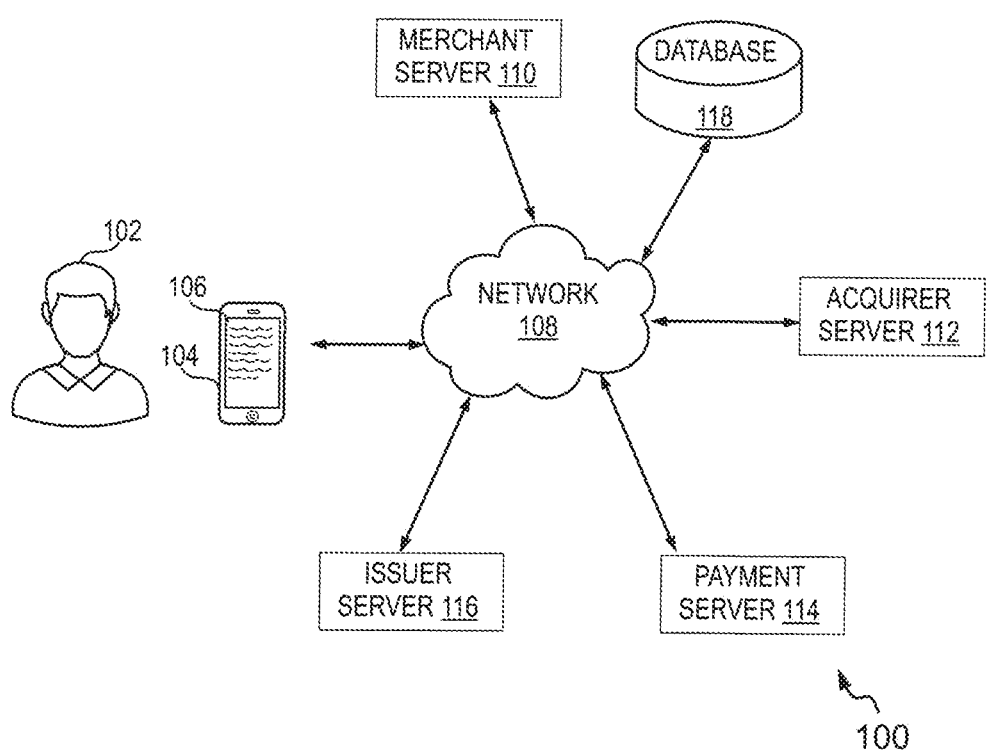
FIG. 1 illustrates an example representation of an environment related to least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card include, but are not limited to, debit cards, credit cards, prepaid cards, virtual payment numbers, virtual card numbers, forex cards, charge cards, e-wallet cards, and stored-value cards. A payment card may be a physical card that may be presented to the merchant for funding the payment. Alternatively or additionally, the payment card may be embodied in form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Overview

Various example embodiments of the present disclosure provide methods and systems for providing payment transactions associated with online purchase orders when there is increased online traffic based on reasons including but not limited to periods such as discounted sale period when payment related resources associated with merchant and the payment network are in use more than their usual usage. Techniques disclosed by various embodiments enable locking of the online purchase orders for users at a set price, and actuating the payment transactions against the locked online purchase orders at a later point of time when the online traffic eases or reduced to a reasonable level. The online purchase orders may be locked using a one-time password (OTP) generated by a server such as including but not limited to a payment server associated with a payment network.

In an example scenario, a customer may purchase goods/services from an online merchant using an electronic device associated with the customer. The online merchant, also referred to hereinafter as a merchant site, may include e-commerce websites, online retail stores, e-business service providers, etc. The customer may purchase one or more items from the merchant site. The purchased items are collected in an e-cart. When the customer checks out the e-cart, the merchant site submits the online purchase order information to a merchant server. The merchant server sends a request for generating an OTP to a payment server, upon receipt of the online purchase order from the merchant site. The payment server generates the OTP after receiving the request.

The payment server provides the OTP to the merchant site via the merchant server. The merchant server encrypts the OTP provided by the payment server to generate a merchant OTP. The merchant OTP is stored for usage in completing the payment transaction at a later point of time. Further, the payment server provides the OTP to the customer. In one example embodiment, the payment server may provide the OTP using a registered contact number of the customer. For instance, each of the customer and the merchant may be registered for a program offered by the payment server, under which a discounted price for items can be locked for the customers when there is increased online traffic in periods such as including but not limited to a discounted sale period. With the registration of the customer with the program, registered contact number of the customer is readily available with the payment server. The payment server may also receive the registered contact number from the merchant server. In another example embodiment, the OTP generated by the payment server may be provided to the customer via the merchant server. More specifically, the merchant server can access a customer profile of the customer that is registered to the merchant site and accesses the registered contact number.

The OTP may be sent to the customer through a short message service (SMS) or an Unstructured Supplementary Service Data (USSD) using the registered contact number. Further, the OTP in the SMS or the USSD may be provided in the merchant site by the customer for locking the online purchase order. The merchant site receives the OTP and transfers the OTP provided by the customer to the merchant server. The merchant server encrypts the OTP provided by the customer to generate a customer OTP. The merchant server may provide the customer OTP to the payment server for facilitating the payment transaction of the locked online purchase order.

After generating customer OTP, the merchant server sends a payment transaction request along with the merchant OTP to the payment server via an acquirer server. The payment server further transfers the payment transaction request and the merchant OTP to an issuer of the customer. Further, the merchant server provides the customer OTP to the issuer server. In one case, the merchant server may directly provide the customer OTP to the issuer server, when the issuer server and the acquirer server belong to the same bank institution. In another case, the merchant server may provide the customer OTP to the issuer server via the payment server, when the issuer server and the acquirer server are different.

The issuer server validates the merchant OTP and customer OTP and proceeds further for payment authorization of the locked online purchase order. A payment amount for the locked online purchase order may be debited from the account of the customer after a successful payment authorization. In case the payment authorization fails, then a notification may be sent to the merchant server. The merchant server may further send a notification to the customer to provide one or more alternative payment options for completing the payment transaction.

The methods and systems for providing payment transactions of online purchase orders in online traffic based on the provision of locking the online purchase orders and completing the payment transactions for the locked online purchase orders using OTP generated by a payment server, are further explained in detail with reference to FIGS. 1 to 12.

FIG. 1 illustrates an example representation of an environment 100 related to at least some example embodiments of the present disclosure. The environment 100 is depicted to include a customer 102 associated with an electronic device 104. The electronic device 104 may be a smartphone, a tablet, a laptop, a computer system or any computing device capable of accessing a merchant site. The merchant site includes, but not limited to e-commerce websites, online retail stores, and e-business service providers. The merchant site may be accessed through a merchant interface 106 in the electronic device 104. For example, the merchant interface 106 may be accessed through a mobile-based application, a web-based application or web browser in the electronic device 104.

More specifically, the merchant site may be hosted by a server, such as a merchant server 110. The merchant server 110 may be configured to store an application program and provision instances of the application, such as the merchant interface 106 to customers, such as the customer 102, for facilitating online purchasing of goods/services from the merchant site. In one case, the instances of the application, such as a mobile application of the merchant interface 106 may be downloaded and installed in the electronic device 104. In another case, a web-based application of the merchant interface 106 may be accessed by the customer 102 using the electronic device 104.

The customer 102 may access the merchant interface 106 in the electronic device 104 using a network, such as network 108. The network 108 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

In one example embodiment, the database 118 may be associated with the merchant server 110 storing details of customers, such as the customer 102. In another example embodiment, the database 118 may be embodied in the merchant server 110. The database 118 may be configured to maintain a customer profile for each customer (e.g., the customer 102). The customer profile may include details, such as customer name, shipping address, contact number, email id, etc. Further, the merchant server 110 may be associated with a merchant (not shown in FIG. 1) or may belong to a third-party for hosting the merchant site. The merchant server 110 may be configured to facilitate advertising of goods and/or services offered by the merchant for sale. During the sale, many customers may be attracted to offers and/or discounts provided by the merchant. Moreover, online traffic may be increased due to increase in customer traffic on the merchant site. In such online traffic, the customers 102 may be engaged in online purchasing in the merchant interface 106.

Figure 5A:
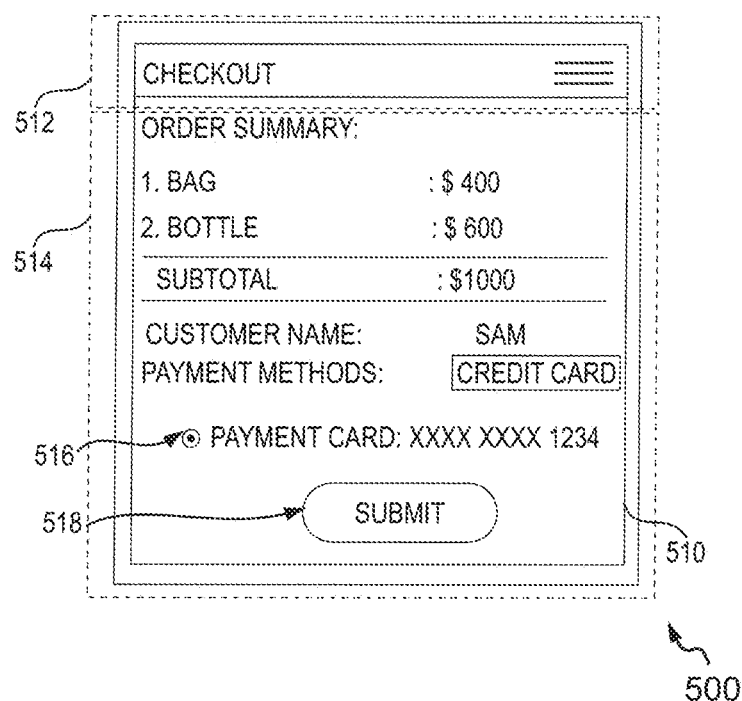
FIG. 5A shows an example representation of a user interface (UI) displayed to a customer on a display screen of an electronic device displaying a checkout page in a merchant interface, in accordance with an example embodiment of the present disclosure.

In an illustrative example scenario, when the customer 102 checks out, an online purchase order that includes one or more goods/services may be collected in an e-cart. The e-cart is displayed to the customer 102 in the merchant interface 106 during the checkout, which is shown in FIG. 5A. In such scenario, when the customer 102 checks out, the online purchase order is submitted to the merchant server 110. When the merchant server 110 receives the online purchase order, a request for generating an OTP is initiated. The merchant server 110 sends the request to a payment server, such as payment server 114. In at least one example embodiment, the request for generating the OTP may be sent via application program interface (API) calls. The merchant server 110 sends the request corresponding to a payment transaction of the purchase order to a payment server, such as payment server 114. In an example embodiment, the request may be sent to the payment server 114 via a payment network (not shown in FIG. 1).

The payment server 114 generates an OTP upon receipt of the request from the merchant server 110. The OTP generated by the payment server 114 is provided to the merchant server 110. The merchant server 110 encrypts the OTP to generate a merchant OTP. The merchant server 110 may store the merchant OTP in the database 118 for using in payment transaction of the online purchase order when the online traffic is reduced. In one example, the merchant OTP may be generated by encrypting the OTP using a standard encryption. The merchant OTP may be generated without performing a hashing encryption so as to prevent replication of the OTP and thereby securing the payment transaction using the merchant OTP.

Figure 5B:
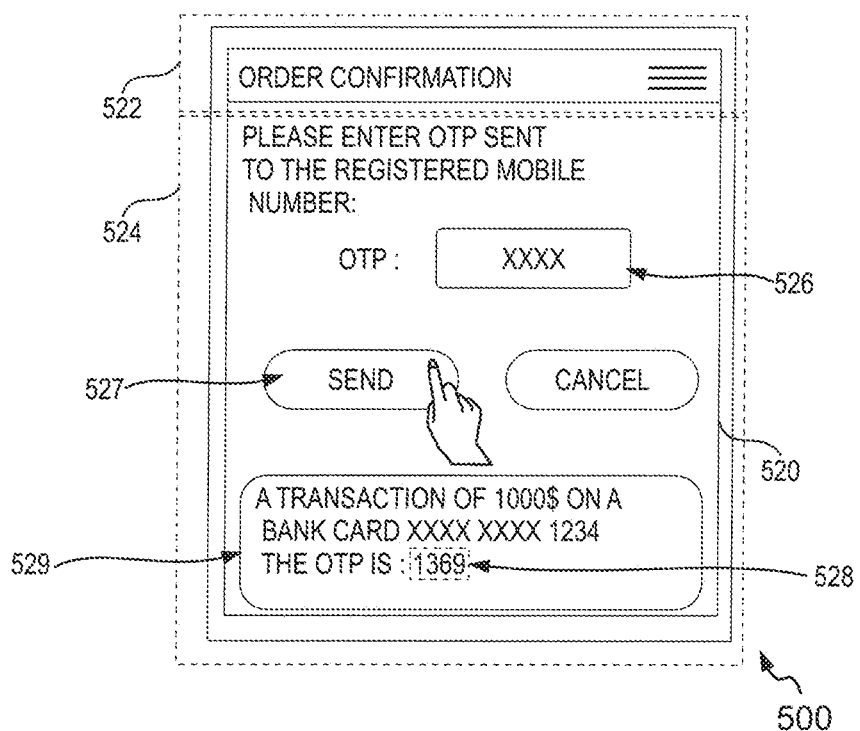
FIG. 5B shows an example representation of a UI displayed to a customer on a display screen of the electronic device displaying receipt of an OTP generated by the payment server and using the OTP for locking the online purchase order, in accordance with an example embodiment of the present disclosure.

Furthermore, the generated OTP is provided to the customer 102, which is described with reference to FIGS. 2A and 2B. In one example embodiment, the OTP generated by the payment server 114 may be provided to customer 102 via the merchant server 110, which is described with reference to FIG. 2A. In another example embodiment, the OTP may be provided to the customer 102 directly by the payment server 114, which is described with reference to FIG. 2B. The OTP may be provided to the customer 102 using a mobile number of the customer 102 registered to the merchant site. In an illustrative example scenario, a customer profile of the customer 102 may be maintained by the merchant server 110. The customer profile may be stored in the database 118. The customer profile may include details, such as customer name, shipping address, contact number, email id, or the like. The merchant server 110 may then access the customer profile to retrieve the registered contact number for sending the OTP to the customer 102. In at least one example embodiment, the customer 102 may receive the OTP as a text message. For instance, the OTP may be provided to the customer 102 through a short messaging service (SMS) or an Unstructured Supplementary Service Data (USSD) notification, which is shown in FIG. 5B.

The customer 102 may retrieve the OTP from the SMS or the USSD and provide the OTP in the merchant interface 106. In an illustrative example scenario, the customer 102 may be asked to provide the OTP during an order confirmation in the merchant interface 106, which is shown in FIG. 5B. After receiving the OTP provided by the customer 102 in the merchant interface 106, the OTP is transferred to the merchant server 110. The merchant server 110 locks the online purchase order in the e-cart upon receipt of the OTP provided the customer 102. Further, the OTP provided by the customer 102 is stored in the database 118 by the merchant server 110. The merchant server 110 encrypts the OTP provided by the customer 102 to generate a customer OTP. The customer OTP is sent to an issuer server 116 by the merchant server 110 for the payment transaction of the locked online purchase order. The issuer server 116 is associated with a financial institution normally called as a "issuer bank" or an "issuing bank" or an "issuer bank" or simply an "issuer", in which the customer 102 may have an account.

Figure 3A:
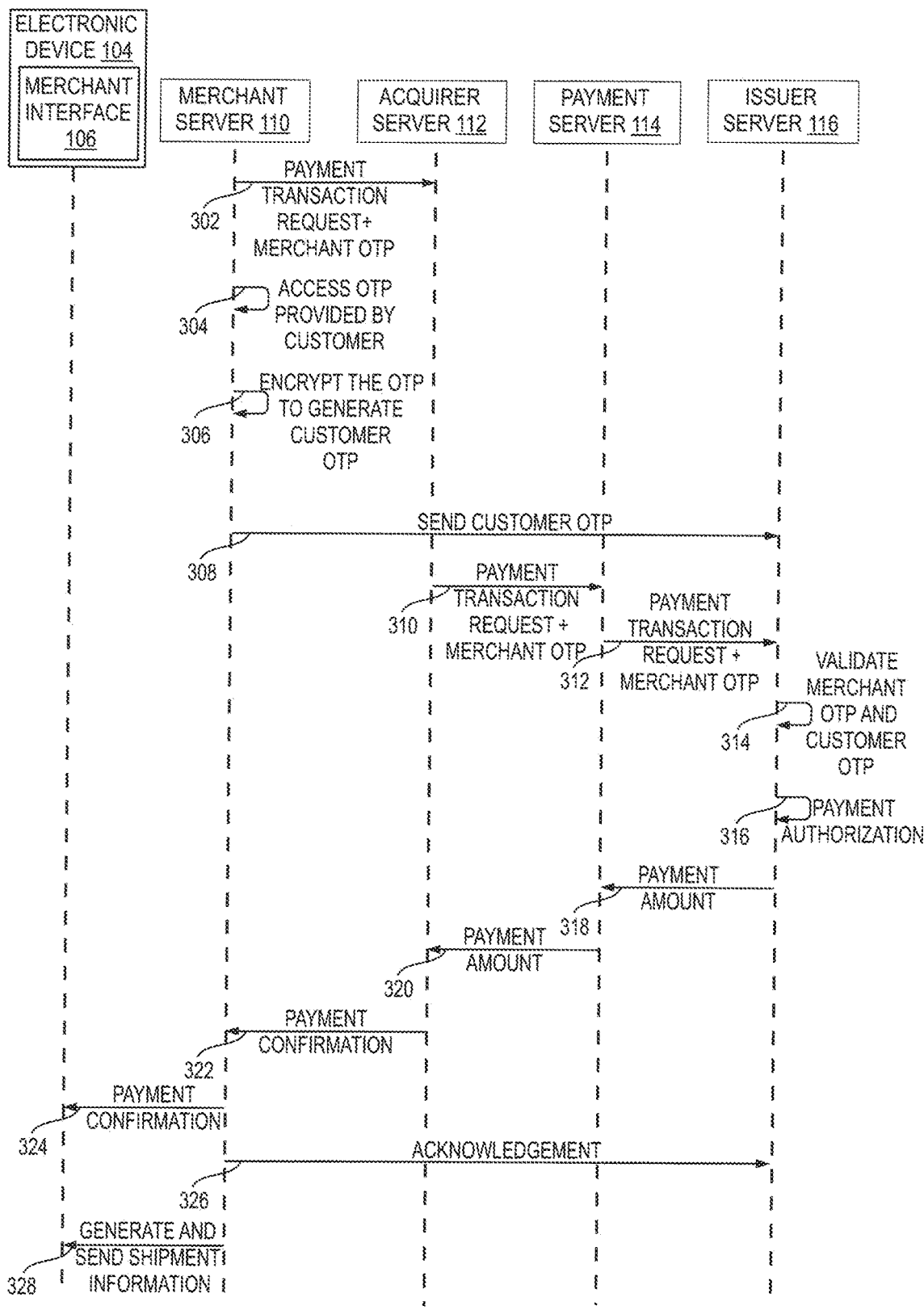
FIG. 3A represents a sequence flow diagram of a payment transaction for a locked online purchase order of a customer, in accordance with an example embodiment of the present disclosure.
Figure 3B:
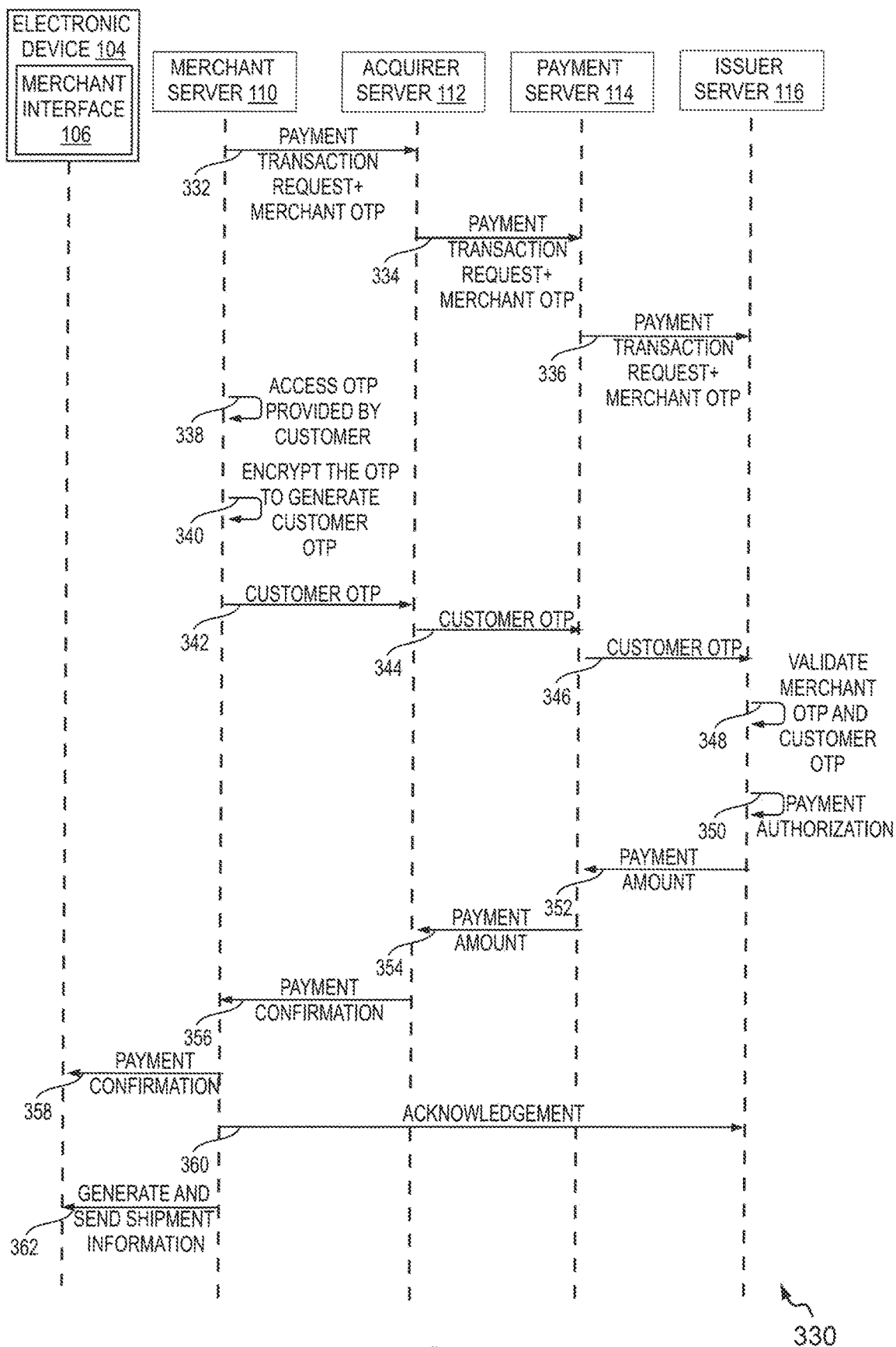
FIG. 3B represents a sequence flow diagram of a payment transaction for the locked online purchase order of the customer, in accordance with another example embodiment of the present disclosure.

The payment transaction for the purchase order may be initiated when an online traffic, such as the customer traffic on the merchant server 110 is reduced, which is described further in FIGS. 3A and 3B. When the customer traffic is reduced, the merchant server 110 may send a payment transaction request along with the merchant OTP to an acquirer sever, such as the acquirer server 112. The acquirer server 112 is associated with a financial institution normally called as a "merchant bank" or an "acquiring bank" or an "acquirer bank" or simply an "acquirer", in which the merchant site or the service provider entities may have an account.

The merchant server 110 sends the payment transaction request and the merchant OTP to the acquirer server 112 via the network 108 and a payment network. Examples of the payment network include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

The acquirer server 112 transfers the payment transaction request and the merchant OTP to the payment server 114. The payment server 114 further transfers the payment transaction request and the merchant OTP to the issuer server 116. After sending the payment transaction request and the merchant OTP, the merchant server 110 may send the customer OTP to the issuer server 116, which is described further with reference to FIGS. 3A and 3B. The issuer server 116 validates both the merchant OTP and the customer OTP by matching both the OTPs. Upon successful validation of the merchant OTP and the customer OTP, a payment authorization for the payment transaction of the locked online purchase order is performed. In one example scenario, the payment authorization may be successful and the payment transaction is completed. In another example scenario, the payment authorization may fail due to issues, such as limited fund in account of the customer 102, temporary issues in payment card of the customer 102, etc. In such scenario, the merchant server 110 may be notified about the payment authorization failure. The merchant server 110 may request the issuer server 116 to provide one or more alternative payment options for completing the payment transaction, which is described with reference to FIGS. 4A and 4B.

Some non-exhaustive example embodiments for providing payment transactions of online purchase orders in online traffic based on provision of locking the online purchase orders and completing the payment transactions for the locked online purchase orders using OTP generated by a payment server, is described with reference to FIGS. 2 to 6A-6B.

Figure 2A:
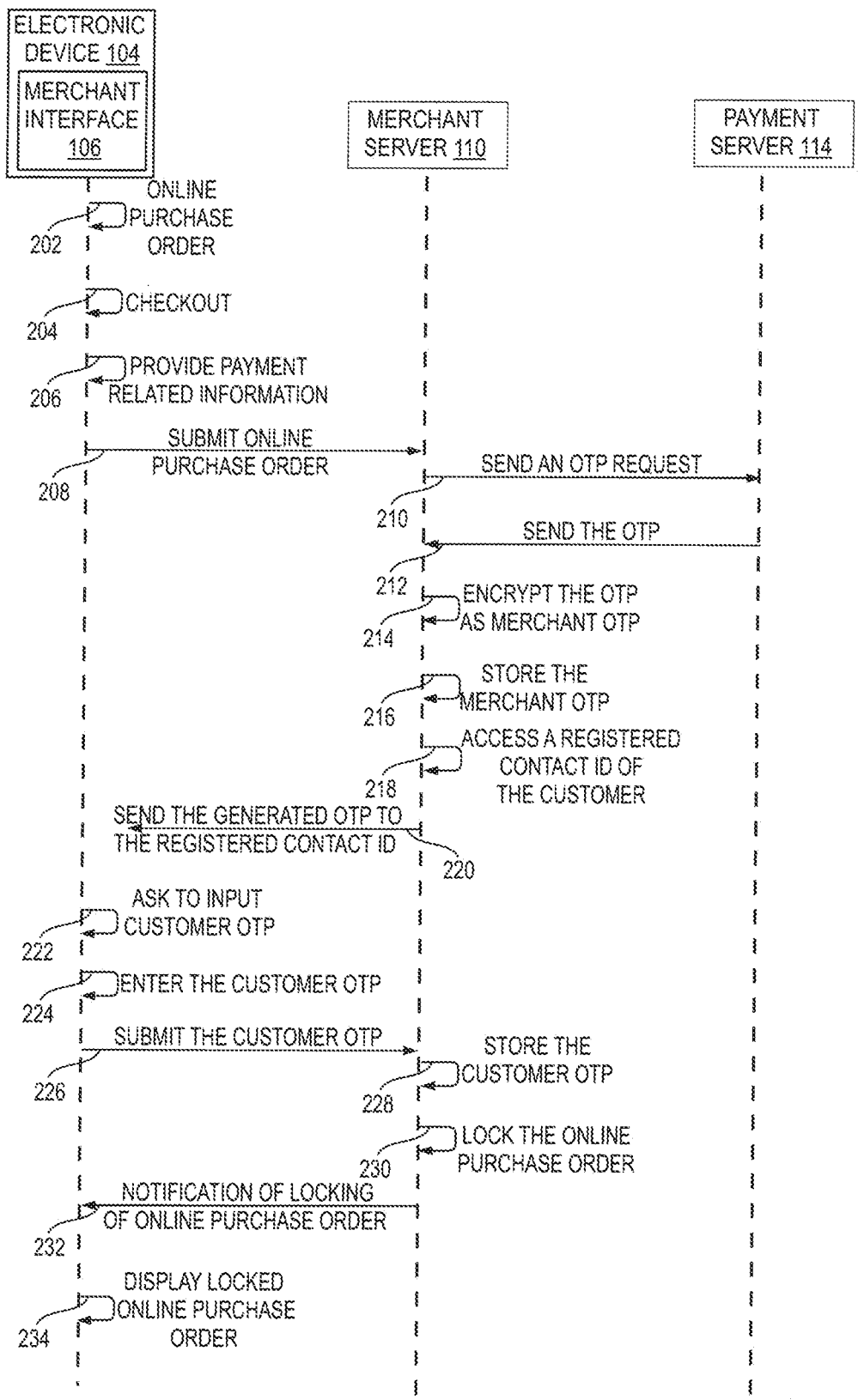
FIG. 2A represents a sequence flow diagram of locking an online purchase order of a customer using an one time password (OTP) generated by a payment server, in accordance with an example embodiment of the present disclosure.

FIG. 2A represents a sequence flow diagram 200 of locking an online purchase order of the customer 102 for at least one item at a set price using an OTP generated by the payment server 114, in accordance with an example embodiment of the present disclosure. In an illustrative example scenario, the customer 102 performs an online purchase of an item (e.g., product and/or service) from a merchant site (e.g., the merchant interface 106 in FIG. 1) using an electronic device (e.g., the electronic device 104 in FIG. 1) when there is a significant online traffic at the merchant site, or there is an ongoing discounted sale period at the merchant site.

At 202, the customer 102 makes an online purchase order from the merchant interface 106 using the electronic device 104. At 204, the customer 102 may be directed to a check out page displaying summary of the purchase order.

At 206, the customer 102 provides payment related information, such as information related to payment transaction for the online purchase order during the check out. In an example, the customer 102 may be required to provide payment card information, a payment option, etc. If profile of the customer 102 is not updated with the merchant interface 106, the customer 102 also provides information such as contact details, name, address, and the like.

At 208, the merchant interface 106 submits information of the online purchase order to the merchant server 110. The online purchase order information may include, but not limited to, a summary of the purchase order, a customer name, a shipping address, a contact number and a payment amount for the purchase order.

At 210, the merchant server 110 sends a request to the payment server 114 for generating an OTP corresponding to a payment transaction for the online purchase order. At 212, OTP generated by the payment server 114, upon receipt of the request, is sent to the merchant server 110.

At 214, the OTP generated by the payment server 114 is encrypted by the merchant server 110 to generate a merchant OTP. At 216, the merchant OTP is stored. In an example embodiment, the merchant OTP may be stored in the database 118 shown in FIG. 1.

At 218, the merchant server 110 accesses a registered contact identifier of the customer 102. An example of the registered contact identifier is a registered mobile number (also referred to as "registered contact number") of the customer 102. Another example of the registered contact identifier is a registered Email identifier (also referred to as "Email ID") of the customer 102. More specifically, a customer profile of the customer 102 may be stored in the database 118. The merchant server 110 may access the customer profile to obtain the registered contact number of the customer 102. It may also be noted that the merchant server 110 may access a registered email ID of the customer 102 instead of the contact number for sending the OTP.

At 220, the OTP generated by the payment server 114 is sent to the customer 102 by the merchant server 110 using the registered contact ID. In an illustrative example scenario, the merchant server 110 may send the OTP via mobile communication network operator of the register mobile number. The network operator may forward the OTP to the registered contact number of the customer 102.

At 222, the customer 102 is asked to input a customer OTP in the merchant interface 106. The customer 102 is supposed to input the received OTP in the merchant interface 106. At 224, the customer 102 enters the OTP in the merchant interface 106. At 226, the merchant interface 106 submits the OTP provided by the customer 102 to the merchant server 110. At 228, the merchant server 110 receives the OTP and stores the OTP provided by the customer 102 as the customer OTP. The OTP provided by the customer 102 may be stored in the database 118 shown in FIG. 1.

At 230, the online purchase order of the customer 102 is locked for the set price upon receiving the OTP provided by the customer 102. For instance, if the price for the item during the ongoing discounted sale period is $75, the purchase order of the customer 102 (in which total billed value is calculated based on the item cost of $75) is locked, and the item is reserved for the customer 102. It will be appreciated by those skilled in the art that till now the payment account of the customer 102 is not debited, and in fact the merchant server 110 has not even sent the payment transaction request to the payment server 114, and the online purchase order of the customer 102 is locked.

At 232, a notification on locking the online purchase order is sent to the merchant interface 106 by the merchant server 110. At 234, the online purchase order being locked is displayed to the customer 102. It is to be noted that entire payment transaction is not completed by following the operations 202 to 234, and only the item to be purchased by the customer 102 is locked for the price of the item. More specifically, the customer OTP received by the merchant server 110 is not sent to the payment server 114 for any comparison or verification purposes. In various embodiments of present disclosure, the payment transaction is attempted for completion after a pre-defined time period, after expiry of sale period, or when the online traffic at the merchant interface 106 and/or merchant server 110 is less than a threshold online traffic. One example of completion of the online purchase is explained with reference to FIGS. 3A and 3B In another example embodiment, the OTP may be provided to the customer 102 directly by the payment server 114 instead of the merchant server 110, which is explained next with reference to FIG. 2B.

Figure 2B:
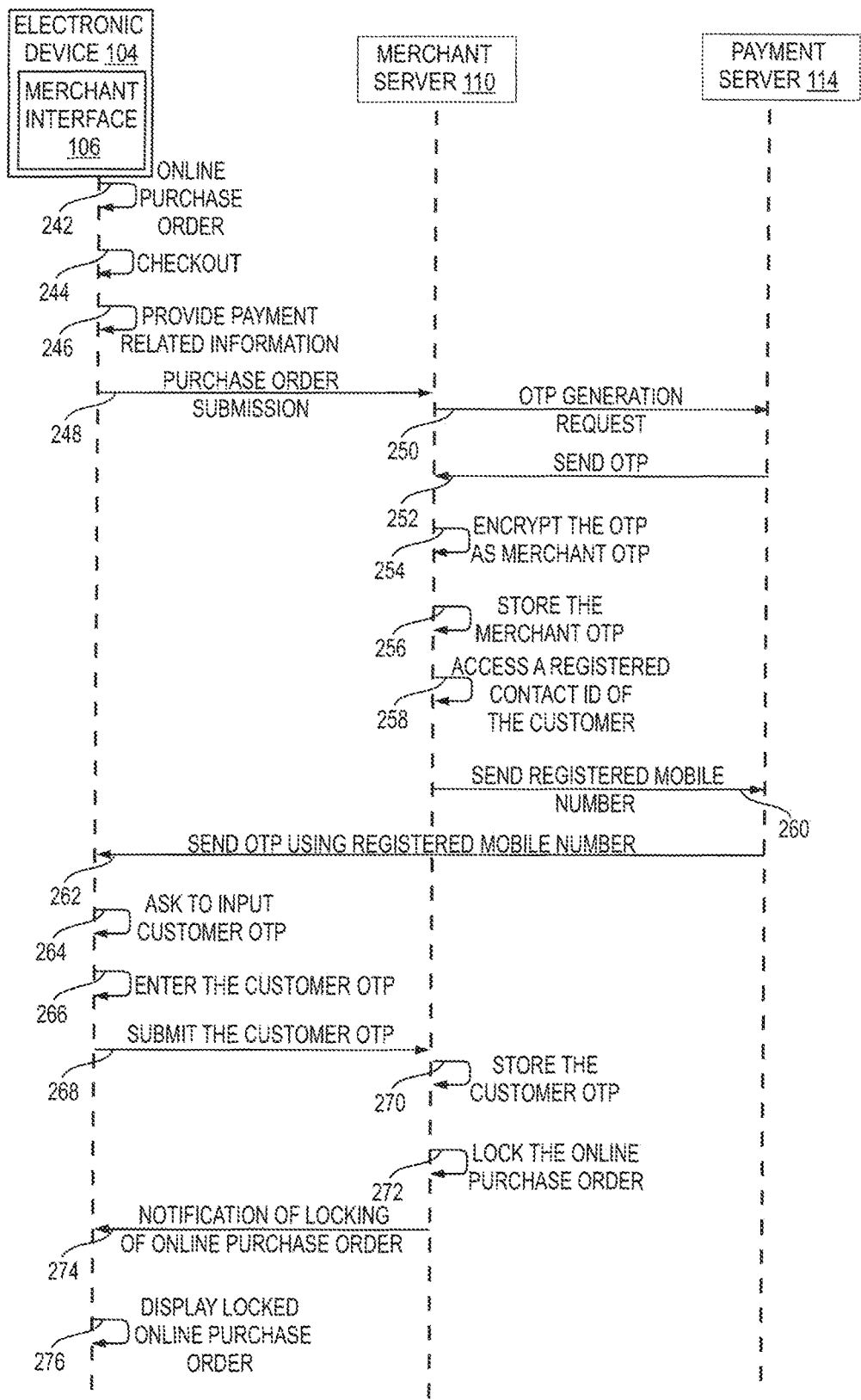
FIG. 2B represents a sequence flow diagram of locking the online purchase order of the customer using the OTP generated by the payment server, in accordance with another example embodiment of the present disclosure.

FIG. 2B represents a sequence flow diagram 240 of locking the online purchase order, in accordance with another example embodiment of the present disclosure.

At 242, the customer 102 makes an online purchase order in the merchant interface 106 using the electronic device 104. At 244, the customer 102 is directed to a check out page displaying summary of the purchase order.

At 246, the customer 102 provides payment related information, such as information related to payment transaction for the online purchase order during the check out. The information may include customer name along with details related to payment information, such as payment options, information of one or more payment cards of the customer 102, etc. At 248, the merchant interface 106 submits the information of the online purchase order to the merchant server 110.

At 250, the merchant server 110 sends a request to the payment server 114 for generating an OTP corresponding to a payment transaction for the online purchase order. At 252, the OTP generated by the payment server 114, upon receipt of the request, is sent to the merchant server 110.

At 254, the merchant server 110 encrypts the OTP to generate a merchant OTP. At 256, the merchant server 110 stores the merchant OTP. For example, the merchant OTP may be stored in the database 118 shown in FIG. 1.

At 258, the merchant server 110 accesses a registered mobile number of the customer 102. More specifically, the merchant server 110 may access a customer profile of the customer 102 to retrieve the registered contact number.

At 260, the registered contact number of the customer 102 is sent to the payment server 114 by the merchant server 110. At 262, the OTP is provided to the customer 102 by the payment server 114 using the registered contact number. For example, the payment server 114 may send the OTP to the customer 102 via a mobile communication network operator associated with the registered contact number. The network operator may forward the OTP to the registered contact number of the customer 102. In an alternate embodiment, the OTP may be provided to a registered email ID of the customer 102. In this embodiment, the payment server 114 may already have the access of the email ID of the customer 102 if the customer 102 is registered with the payment server 114. Alternatively, the payment server 114 can obtain the email ID from the merchant server 110 as the customer 102 is already registered with the merchant server 110.

At 264, the customer 102 is asked to provide the received OTP in the merchant interface 106. At 266, the customer 102 enters the OTP in the merchant interface 106.

At 268, the OTP provided by the customer 102 in the merchant interface 106 is sent to the merchant server 110. At 270, the merchant server 110 stores the OTP provided by the customer 102. At 272, the merchant server 110 locks the online purchase order of the customer 102.

At 274, a notification of locking the online purchase order is provided to the merchant interface 106 by the merchant server 110. At 276, the online purchase order being locked is displayed to the customer 102 on his electronic device 104.

A payment transaction for the locked online purchase order is performed after the expiry of a time period, wherein the time period is determined based on how much time is left for the completion of the ongoing sale period, or an instant when the online traffic is reduced below the threshold level. An example of performing the payment transaction is explained further with reference to FIGS. 3A and 3B.

FIG. 3A represents a sequence flow diagram 300 of a payment transaction for a locked online purchase order of the customer 102, in accordance with an example embodiment of the present disclosure. The payment transaction of the purchase order may be initiated in scenarios such as when the current online traffic is less the threshold level, or after a pre-defined time period, or at the end of discount or sale period. On occurrence of any of these scenarios, the merchant server 110 (shown in FIG. 1) initiates a payment transaction request. The merchant server 110 accesses the merchant OTP stored in a database (e.g., the database 118 described with reference to FIG. 1).

At 302, the merchant server 110 sends the payment transaction request and the merchant OTP to the acquirer server 112. At 304, the merchant server 110 accesses the OTP provided by the customer 102. At 306, the OTP provided by the customer 102 is encrypted to generate a customer OTP by the merchant server 110. In an embodiment, the OTP provided by the customer 102 may be encrypted using a public key. The public key may be provided by the issuer server 116 to encrypt the OTP. For example, the merchant server 110 may communicate with the issuer server 116 using a transport layer security protocol. In an example scenario, an acquirer server 112 of the merchant site and an issuer server 116 of the customer 102 may belong to one financial institution. In such scenario, the merchant server 110 may directly communicate with the issuer server 116.

At 308, the customer OTP is sent to the issuer server 116 by the merchant server 110. At 310, the acquirer server 112 transfers the payment transaction request and the merchant OTP to the payment server 114. At 312, the payment server 114 further transfers the payment transaction request and the merchant OTP to the issuer server 116.

At 314, the issuer server 116 validates the merchant OTP and the customer OTP. More specifically, the merchant OTP and the customer OTP are decrypted by the issuer server 116. If both the OTPs, such as the customer OTP and the merchant OTP, are the same, the issuer server 116 validates the customer OTP.

At 316, the issuer server 116 performs a payment authorization for the payment transaction of the locked online purchase order. The step of payment authorization may include, among other things, checking eligibility of payment account and the available balance in payment account of the customer 102. After successful payment authorization, a payment amount is debited from account of the customer 102.

At 318, the issuer server 116 transfers the payment amount to the payment server 114. At 320, the payment server 114 transfers the payment amount to the acquirer server 112. At 322, the acquirer server 112 sends a payment confirmation to the merchant server 110. At 324, the merchant server 110 forwards the payment confirmation to the merchant interface 106.

At 326, the merchant server 110 sends an acknowledgement to the issuer server 116. At 328, shipment notification for the online purchase order is generated and sent to the customer 102 after receiving the payment confirmation. The shipment notification can also be displayed in the merchant interface 106 when the customer 102 logins into the merchant interface 106.

In another example scenario, the acquirer server 112 of the merchant interface 106 and the issuer server 116 of the customer 102 may belong to different financial institutions. In such scenario, the merchant server 110 may send the customer OTP to the issuer server 116 via the payment server 114, which is described with reference to FIG. 3B.

Referring now to FIG. 3B, a sequence flow diagram 330 of a payment transaction for the locked purchase order of the customer is illustrated in accordance with another example embodiment of the present disclosure.

At 332, the merchant server sends a payment transaction request and a merchant OTP to the acquirer server 112. At 334, the acquirer server 112 transfers the payment transaction request and the merchant OTP to the payment server 114. At 336, the payment server 114 further transfers the payment transaction request and the merchant OTP to the issuer server 116.

At 338, the merchant server 110 retrieves the OTP provided by the customer 102. At 340, the OTP provided by the customer 102 is encrypted by the merchant server 110 to generate a customer OTP.

At 342, the merchant server 110 sends the customer OTP to the acquirer server 112. At 344, the acquirer server 112 transfers the customer OTP to the payment server 114. At 346, the payment server 114 further transfers the customer OTP to the issuer server 116.

At 348, the issuer server 116 validates the merchant OTP and the customer OTP as described in operation 314 with reference to FIG. 3A. At 350, the issuer server 116 performs a payment authorization for the payment transaction of the locked online purchase order as described in operation 316 with reference to FIG. 3A.

At 352, the issuer server 116 transfers the payment amount to the payment server 114. At 354, the payment server 114 transfers the payment amount to the acquirer server 112.

At 356, the acquirer server 112 sends a payment confirmation to the merchant server 110. At 358, the merchant server 110 forwards the payment confirmation to the merchant interface 106. At 360, the merchant server 110 sends an acknowledgement on receiving the payment confirmation to the issuer server 116. At 362, shipment information for the online purchase order is generated and sent to the customer 102.

In one example scenario, the payment authorization for the payment transaction of the online purchase order may fail. In such scenario, the merchant server 110 may request for one or more alternative payment options to the issuer server 116 for completing the payment transaction, which is explained next with reference to FIGS. 4A and 4B.

Figure 4A:
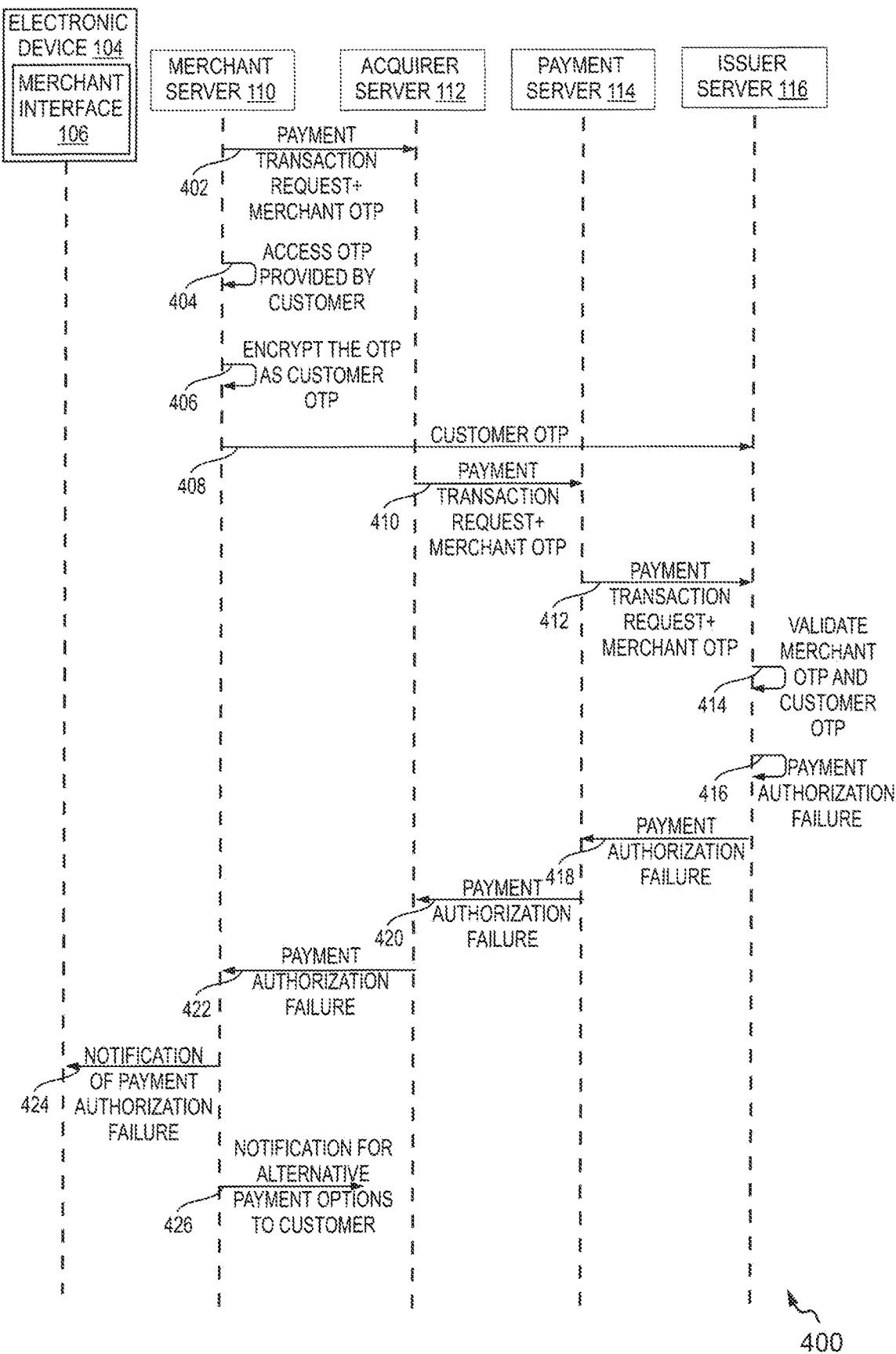
FIG. 4A represents a sequence flow diagram of sending a request for providing one or more alternative payment options in a payment authorization failure, in accordance with an example embodiment of the present disclosure.

Referring now to FIG. 4A, a sequence flow diagram 400 of sending a request for providing one or more alternative payment options in case of a payment authorization failure for the online purchase order, is illustrated in accordance with an example embodiment of the present disclosure. In an illustrative example scenario, the acquirer server 112 and the issuer server 116 may be same for a merchant. In such scenario, when there is a payment authorization failure, the merchant server 110 may directly send a request to the customer 102 to provide the one or more alternative payment options.

At 402, the merchant server 110 sends a payment transaction request and the merchant OTP to the acquirer server 112. At 404, the merchant server 110 accesses the OTP provided by the customer 102 in the merchant interface 106. At 406, the merchant server 110 encrypts the OTP to generate a customer OTP. At 408, the merchant server 110 sends the customer OTP to the issuer server 116.

At 410, the acquirer server 112 transfers the payment transaction request and the merchant OTP to the payment server 114. At 412, the payment server 114 further transfers the payment transaction request and the merchant OTP to the issuer server 116.

At 414, the issuer server 116 validates the merchant OTP and the customer OTP to find out if both OTPs are same. At 416, a payment authorization for payment transaction of the locked online purchase order be a failure. For example, the payment authorization may fail due to insufficient balance in account of the customer 102 or due to both OTPs not matching to each other.

At 418, the issuer server 116 sends a message of payment authorization failure to the payment server 114. At 420, the payment server 114 transfers the payment authorization failure to the acquirer server 112. At 422, the acquirer server 112 further transfers the payment authorization failure to the merchant server 110.

At 424, the merchant server 110 sends a notification of the payment authorization failure to the customer 102 and optionally also to merchant interface 106. At 426, the merchant server 110 sends a request to provide one or more alternative payment options to the customer using the registered contact IDs of the customer 102. For example, the merchant server 110 sends a notification to use alternate payment options to complete the payment transaction to the customer 102 through email or SMS to the contact number of the customer 102. Alternatively or additionally, if the customer 102 has downloaded an application associated with the merchant interface 106, a notification to use alternate payment options to complete the payment transaction for the locked purchase order can be sent through the application associated with the merchant interface 106.

In another example scenario, the acquirer server 112 and the issuer server 116 may belong to different financial institutions. In such scenario, when a payment authorization failure occurs, the request for the issuer server 116 to provide one or more alternative payment options may be sent through the payment server 114. The process of sending the request to the issuer server 116 for providing one or more alternative payment options through the payment server 114 is described next with reference to FIG. 4B.

Figure 4B:
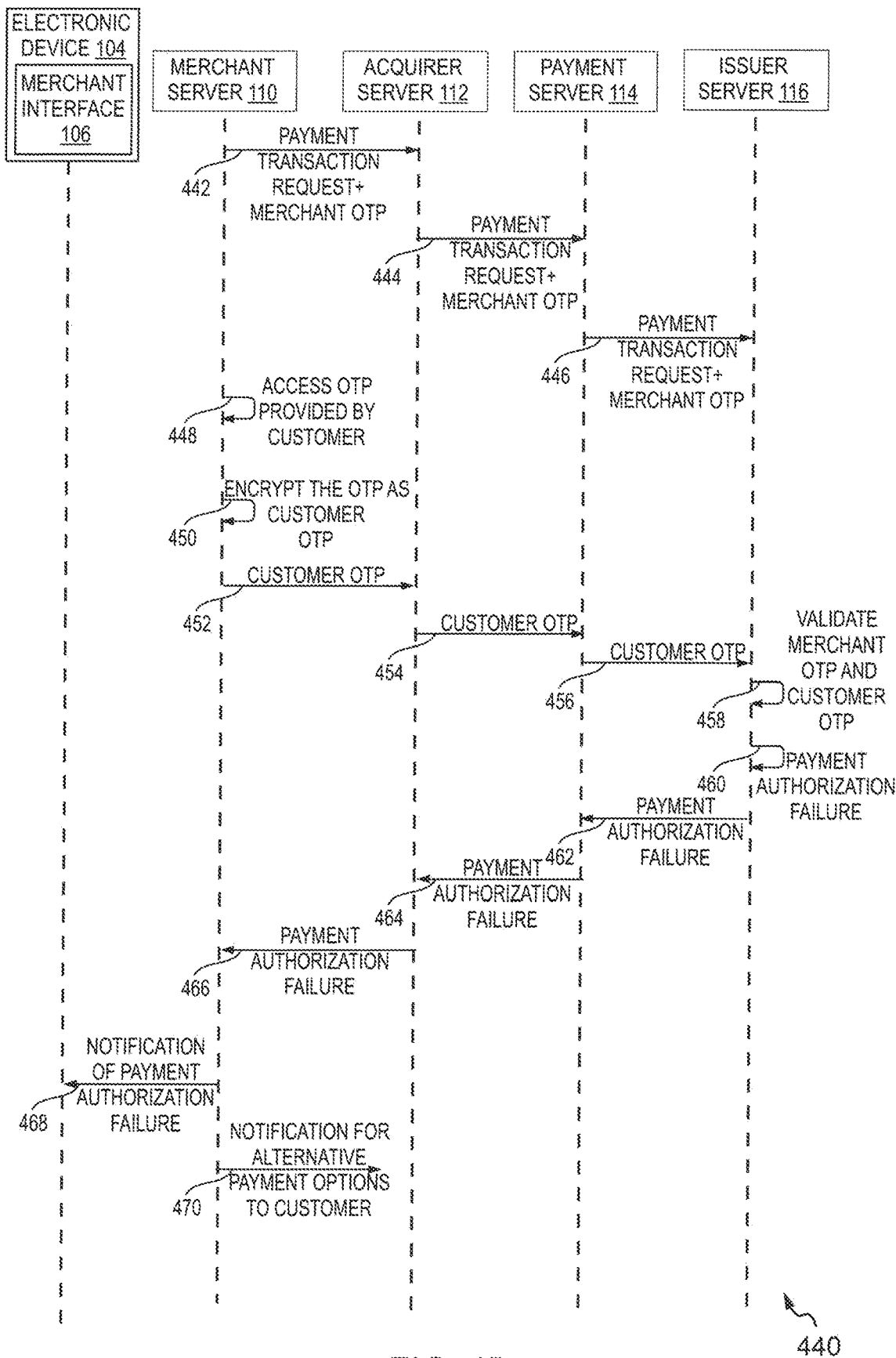
FIG. 4B represents a sequence flow diagram of sending a request for providing one or more alternative payment options in a payment authorization failure, in accordance with another example embodiment of the present disclosure.

Referring now to FIG. 4B, a sequence flow diagram 440 of sending a request for providing one or more alternative payment options in a payment authorization failure for the online purchase order is illustrated, in accordance with another example embodiment of the present disclosure.

At 442, the merchant server 110 sends the payment transaction request and the merchant OTP to the acquirer server 112. At 444, the acquirer server 112 transfers the payment transaction request and the merchant OTP to the payment server 114. At 446, the payment server 114 further transfers the payment transaction request and the merchant OTP to the issuer server 116.

At 448, the merchant server 110 accesses the OTP provided by the customer 102 in the merchant interface 106. At 450, the merchant server 110 encrypts the OTP to generate a customer OTP. At 452, the merchant server 110 transfers the customer OTP to the acquirer server 112. At 454, the acquirer server 112 provides the customer OTP to the payment server 114. At 456, the payment server 114 further provides the customer OTP to the issuer server 116.

At 458, the issuer server 116 validates the merchant OTP and the customer OTP. At 460, a payment authorization failure for payment transaction of the locked online purchase order occurs due to failure of validations of the merchant OTP and the customer OTP.

At 462, the issuer server 116 notifies a payment authorization failure to the payment server 114. At 464, the payment server 114 notifies the payment authorization failure to the acquirer server 112. At 466, the acquirer server 112 further notifies the payment authorization failure to the merchant server 110. At 468, the merchant server 110 sends a notification on the payment authorization failure to the customer 102 via one or more channels such as SMS sent on registered mobile number of the customer 102, Email on registered email ID of the customer 102 or in an application associated with the merchant interface 106 installed on the electronic device 104 of the customer 102.

At 470, the merchant server 110 sends a request to provide one or more alternative payment options to the customer 102 using available means such as customer mobile number, Email ID or through the merchant application available or installed in the electronic device 104 of the customer 102.

In one example embodiment, the merchant server 110 may provide the merchant interface 106 that causes display of one or more user interfaces (UIs) for receiving inputs from the customer 102 in a check out page, for receiving an OTP in an order confirmation page and for displaying shipping details in an order shipment page. Without loss of generality, some examples of the UIs displayed to the customer 102 are described with reference to FIGS. 5A-5C.

Referring now to FIG. 5A, an example representation of a UI 500 displayed to the customer 102 on a display screen of an electronic device, such as the electronic device 104 displaying a checkout page 510 in the merchant interface 106 is shown in accordance with an example embodiment of the present disclosure. The electronic device 104 and the merchant interface 106 are described in FIG. 1. The UI 500 is an exemplary display of a check out page for a purchase order of the customer 102.

As shown in FIG. 5A, the checkout page 510 is depicted to include a header portion 512 and a content portion 514. The header portion 512 is depicted to exemplarily display a title associated with text 'CHECKOUT'. As shown in FIG. 5A, the content portion 514 includes an order summary, a customer name, a selection option for different payment methods (e.g., see Credit Card), and a payment card information 516. The content portion 514 is an example representation, and it can be customized in a variety of different ways than that of shown in FIG. 5A.

The customer 102 may provide required information for checking out of the purchase order. The information provided by the customer 102 corresponding to the online purchase order may be submitted by clicking on a submit button, such as submit button 518. After submitting the purchase order, the merchant interface 106 may present one or more UIs for order confirmation of the purchase order.

As explained with reference to FIGS. 2A and 2B, the merchant interface 106 submits the purchase order information to the merchant server 110. The merchant server 110 initiates a request to the payment server 114 for generating an OTP, upon receiving the purchase order information. The OTP generated by the payment server 114 is provided to the merchant server 110. The OTP is further provided to the customer 102, which is shown in FIG. 5B. The customer 102 may be required to provide the OTP in an order confirmation page, which is described next with reference to FIG. 5B.

Referring now to FIG. 5B, an example representation of the UI 500 displayed to the customer 102 on the display screen of the electronic device 104 displaying receiving of an OTP in an order confirmation page 520, such as OTP 528 generated by the payment server 114 and using the OTP 528 for locking the online purchase order in an order confirmation page 550 is shown in accordance with an example embodiment of the present disclosure. The order confirmation page 520 is presented to the customer 102 in response to the submission of the purchase order in the checkout page 510 (shown in FIG. 5A).

As shown in FIG. 5B, the order confirmation page 520 is depicted to include a header portion 522 and a content portion 524. The header portion 522 is depicted to exemplarily display a title associated with text 'ORDER CONFIRMATION'. The content portion 524 is depicted to include an input field, such as an OTP field 526 for accepting an OTP 528 from the customer 102. As explained with reference to FIGS. 2A and 2B, the customer 102 may receive the OTP 528 through a registered contact number of the customer 102. In an illustrative example scenario, the customer 102 may receive a message with the OTP. As shown in FIG. 5B, the customer 102 may receive message 529 with the OTP 528. The message 529 may include an SMS or a USSD notification. The OTP 528 is entered in the OTP field 526 by the customer 102.

The customer 102 clicks on a send button, such as send button 527 after entering the OTP 528. When the customer 102 clicks on the send button 527, the OTP 528 is sent to the merchant server 110.

As explained with reference to FIGS. 2A and 2B, the merchant server 110 receives the OTP 528 and stores the OTP 528 for completing the payment transaction for the locked purchase order. After receiving the order confirmation, a status of the purchase order being locked is displayed to the customer 102. An example UI provisioned to the customer 102 for displaying the locked purchase order in an order shipment page is shown in FIG. 5C.

Figure 5C:
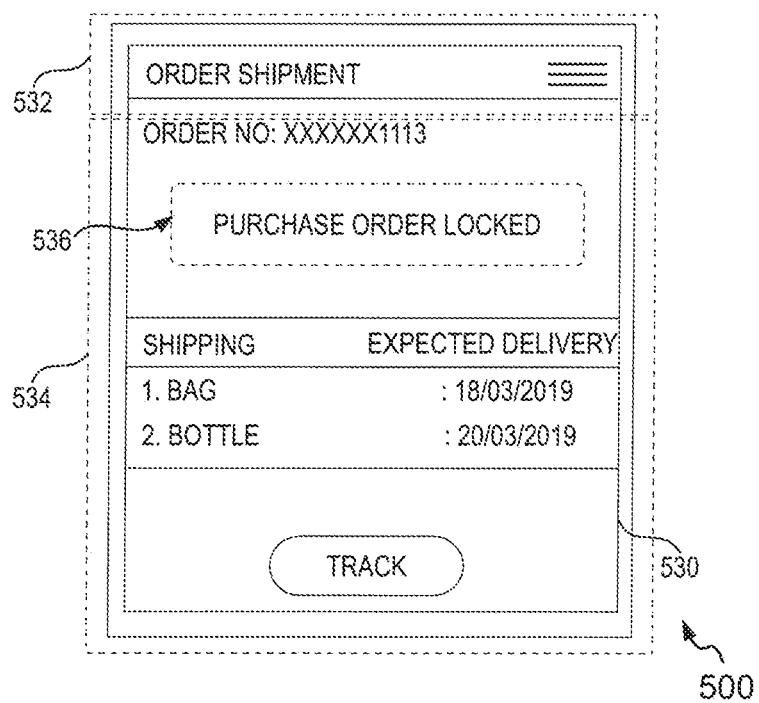
FIG. 5C shows an example representation of a UI displayed to the customer on a display screen of the electronic device displaying shipment information after locking the online purchase order, in accordance with an example embodiment of the present disclosure.

Referring now to FIG. 5C, an example representation of the UI 500 displayed to the customer 102 on a display screen of the electronic device 104 displaying shipment information after locking the online purchase order in an order shipment page 530 is shown, in accordance with an example embodiment of the present disclosure. The order shipment page 530 is depicted to include a header portion 532 and a content portion 534. The header portion 532 is depicted to include a title associated with text 'ORDER SHIPMENT'. The content portion 534 is depicted to include shipment information of the locked online purchase order. The content portion 534 is further depicted to include a text 536 associated with 'PURCHASE ORDER IS LOCKED' displayed to the customer 102.

Figure 6A:
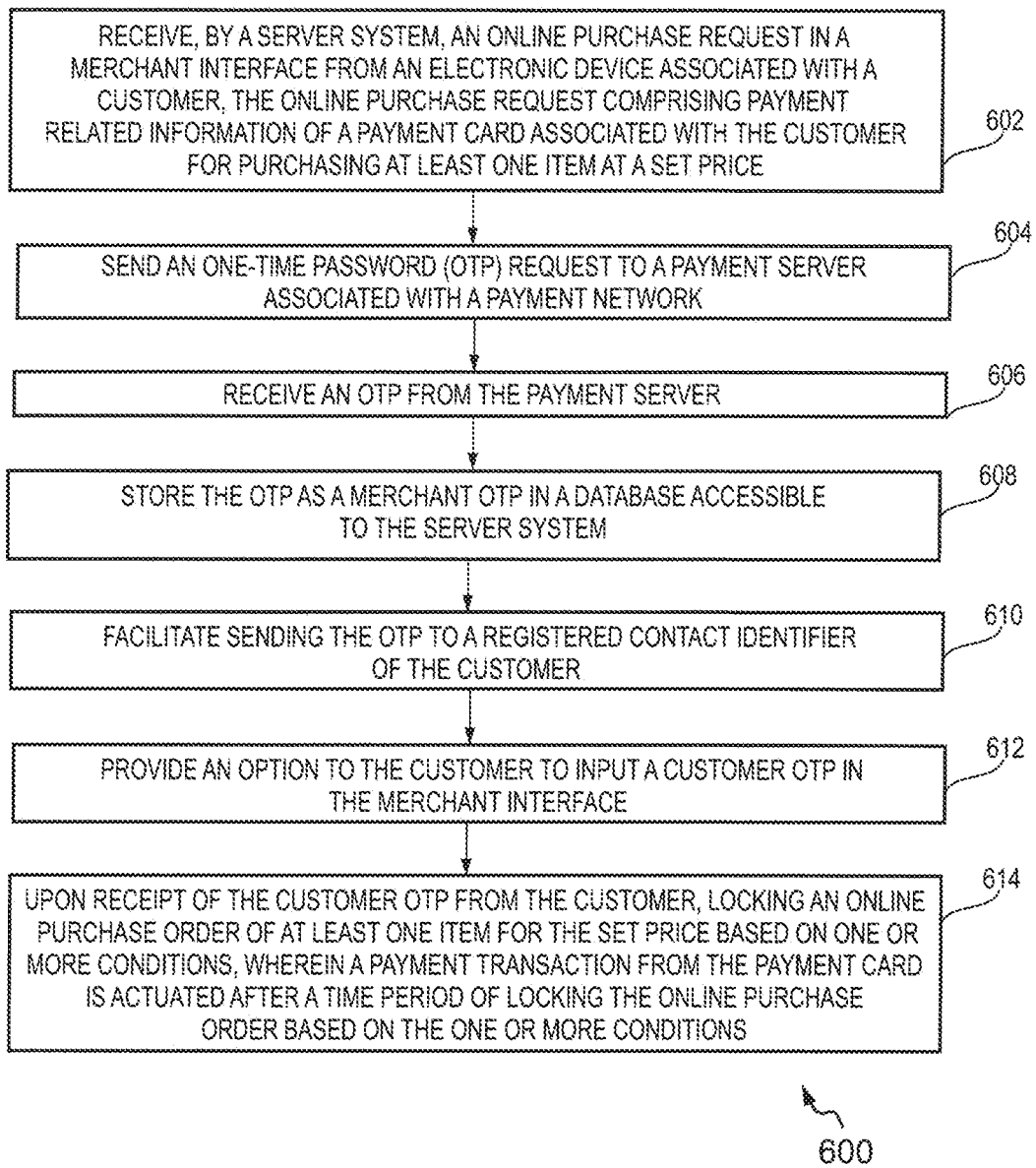
FIG. 6A illustrates a flow diagram depicting a method for providing payment transactions in online traffic, in accordance with an example embodiment of the present disclosure.

FIG. 6A illustrates a flow diagram 600 depicting a method for providing payment transactions in online traffic, in accordance with an example embodiment of the present disclosure. The method depicted in the flow diagram 600 may be executed by a server system, for example, the merchant server 110. Operations of the flow diagram 600, and combinations of operation in the flow diagram 600, may be implemented by, for example, hardware, firmware, a processor, circuitry and/or a different device associated with the execution of software that includes one or more computer program instructions. The method starts at operation 602.

At operation 602, the method includes receiving an online purchase request in a merchant interface from an electronic device associated with a customer such as the customer 102. The online purchase request includes payment related information of a payment card associated with the customer 102 for purchasing at least one item at a set price. For instance, the customer 102 wants to purchase a book in a discounted sale period offered by online portal of the merchant. The customer 102 accesses the merchant interface 106 through the merchant application or web browser and selects the item (such as a book), quantity and provides the payment related information to the merchant interface 106. It is noted that during the discounted sale period, the book is sold at a set price (e.g., $75), which may be lower than its standard price during no sale periods.

At 604, the method includes sending an OTP request to a payment server (e.g., the payment server 114) associated with a payment network. The server system for instance the merchant server 110 may send the OTP request to the payment server via an acquirer server (e.g., the acquirer server 112).

At 606, the method includes receiving an OTP from the payment server.

At 608, the method includes storing the OTP as a merchant OTP in a database accessible to the server system.

At 610, the method includes facilitating sending the OTP to a registered contact identifier of the customer. Examples of the registered contact identifier may include but not limited to registered contact number such as mobile number, registered Email ID, or any other identifier which can be used to communicate with the customer. The OPT may be sent in form of SMS, or call or Email, Voice message, or multimedia message.

At 612, the method includes providing an option to the customer to input a customer OTP in the merchant interface. For instance, a text box, or voice input means can be provided in the merchant interface for the customer to provide a customer OTP. It is noted that the customer is supposed to provide the OTP received by the customer at the registered contact ID of the customer as the customer OPT in the merchant interface.

Upon receipt of the customer OTP from the customer, at 614, the method includes locking an online purchase order of the at least one item (such as a book) for the set price based on one or more conditions. It is noted that set price, such as $75, is locked for the online purchase order, and online purchase order is accepted, however the payment transaction is not completed. The online purchase order is locked for a time period that is based on one or more conditions, and it can be customized as well. Some examples of the one or more conditions may include network related conditions, item related conditions, and customer related conditions. Example of the network related conditions may include 1. current load of network traffic at the server system, 2. current success/failure rates of other payment transactions performed by the server system, 3. Internet speed, 4. Type of devices used by the customer and the server system and the like. Examples of the item related conditions include 1. How much time is left for the discounted sale period, 2. Availability of the item with the merchant, 3. Cost of the item, and the like. Examples of the customer related conditions include 1. How is the credit history of the customer 2. Has customer been part of similar transaction in which purchase order was locked and the customer made successful payment later, 3. type of payment account of the customer, and the like.

Once the time period for which the online purchase order is locked elapses, the method depicted in flow diagram 600 includes actuating the payment transaction as explained with reference to FIGS. 3A, 3B. For instance, the server system, such as the merchant server, sends the customer OTP to the issuer server of the customer. Also the merchant sever sends the payment transaction request and the merchant OTP to the payment server, which in turn sends it to the issuer sever. The issuer validates the merchant OTP and the customer OTP to perform a payment authorization for the payment transaction of the locked online purchase order, which is described in FIGS. 3A and 3B. For instance, once the issuer server has both the OTPs, such as the customer OTP and the merchant OTP, the issuer server performs validation of the OTPs for example, by matching if both the OTPs are same. Once the validation is successful, payment transaction is approved and processed, and notification is sent to the customer and the merchant. In case the payment transaction is declined, the customer may be notified to provide one or more alternate payment options for completing the payment transaction, which is described in FIGS. 4A and 4B.

Figure 6B:
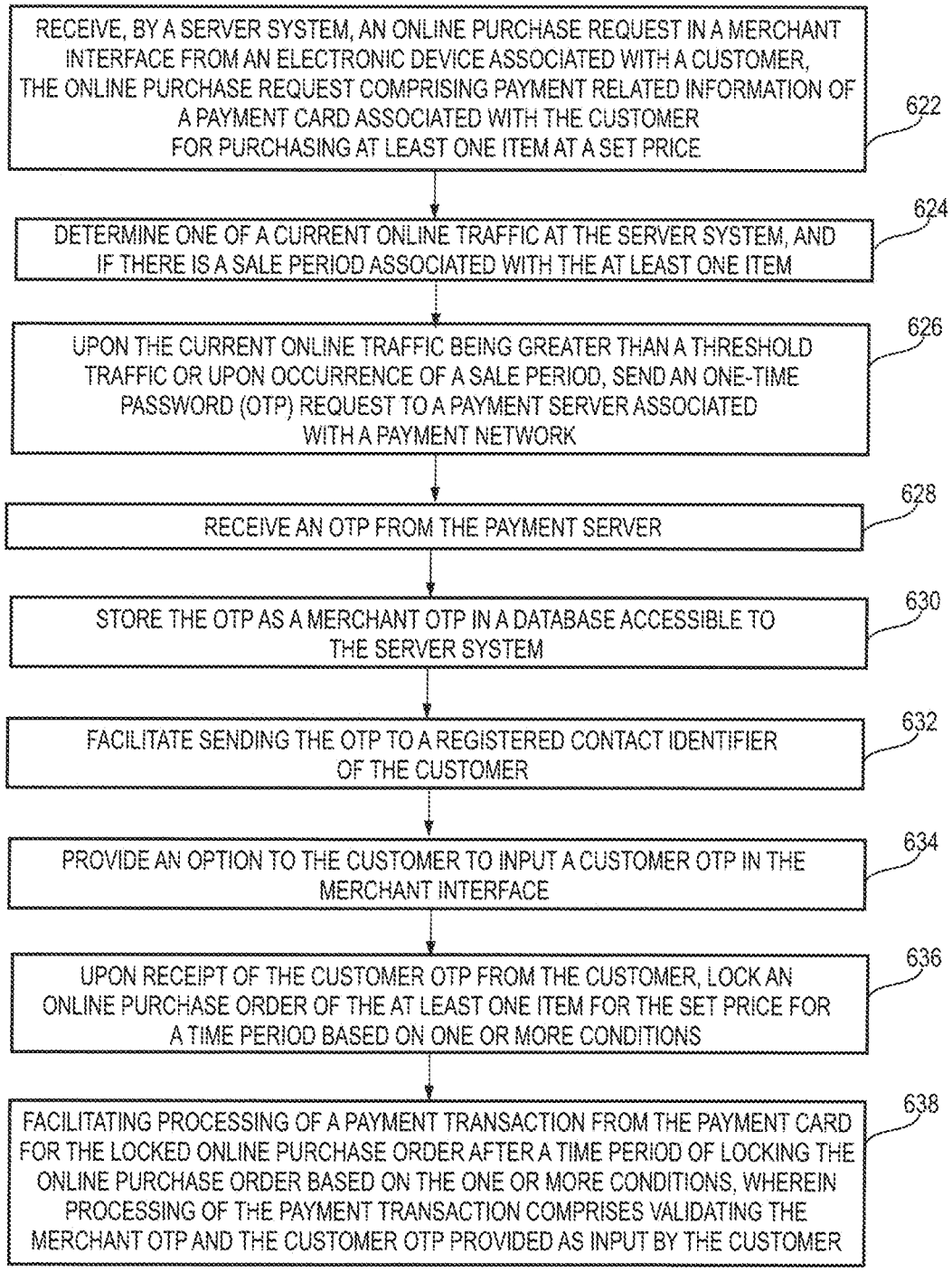
FIG. 6B illustrates a flow diagram depicting a method for providing payment transactions in online traffic, in accordance with another example embodiment of the present disclosure.

FIG. 6B illustrates a flow diagram 620 depicting a method for providing payment transactions when there is increased online traffic, in accordance with another example embodiment of the present disclosure. The method depicted in the flow diagram 620 may be executed by a server system, for example, the merchant server 110. Operations of the flow diagram 620, and combinations of operation in the flow diagram 620, may be implemented by, for example, hardware, firmware, a processor, circuitry and/or a different device associated with the execution of software that includes one or more computer program instructions. The method starts at operation 622.

At operation 622, the method includes receiving an online purchase request in a merchant interface from an electronic device associated with a customer such as the customer 102. The operation 622 is same as the operation 602 described with reference to FIG. 6A.

At operation 624, the method includes determining one of: 1. current online traffic and 2. if there is a sale period associated with the at least one item.

At 626, the method includes sending an OTP request to a payment server (e.g., the payment server 114) associated with a payment network based on predefined conditions. One predefined condition occurs when the current network online traffic is greater than a threshold network traffic. Another predefined condition occurs if there is an ongoing sale period for the at least one item to be purchased by the customer.

At 628, the method includes receiving an OTP from the payment server.

At 630, the method includes storing the OTP as a merchant OTP in a database accessible to the server system.

At 632, the method includes facilitating sending the OTP to a registered contact identifier of the customer. Examples of the registered contact identifier may include but not limited to registered contact number such as mobile number, registered Email ID, or any other identifier which can be used to communicate with the customer. The OPT may be sent in form of SMS, or call or Email, Voice message, or multimedia message.

At 634, the method includes providing an option to the customer to input a customer OTP in the merchant interface. For instance, a text box, or voice input means can be provided in the merchant interface for the customer to provide a customer OTP. It is noted that the customer is supposed to provide the OTP received by the customer at the registered contact ID of the customer as the customer OPT in the merchant interface.

Upon receipt of the customer OTP from the customer, at 636, the method includes locking an online purchase order of the at least one item (such as a book) for the set price based on one or more conditions. It is noted that the set price, such as $75, is locked for the online purchase order. In one embodiment, the online purchase order is locked for a time period that is based on one or more conditions described with reference to FIG. 6A.

Once the time period for which the online purchase order is locked elapses, at 638, the method includes facilitating processing of payment transaction from the payment card for the locked online purchase order. The payment transaction is processed based at least on validating the merchant OTP and the customer OTP provided as input by the customer, as described with reference to FIGS. 3A and 3B.

In one embodiment, the payment transaction is processed after a time period of locking of the online purchase order, wherein the time period is determined based on the one or more conditions. For instance, one condition may be a time instant when the current online traffic becomes less than the threshold level of online traffic. Another condition may be the completion of the ongoing sale period. Another condition may be a fixed time out period defined by the merchant or the customer.

The sequence of operations of the method depicted in flow diagram 620 need not be necessarily executed in the same order as they are presented. Further, one or more operations may be grouped together and performed in form of a single step, or one operation may have several sub-steps that may be performed in parallel or in sequential manner.

Figure 7:
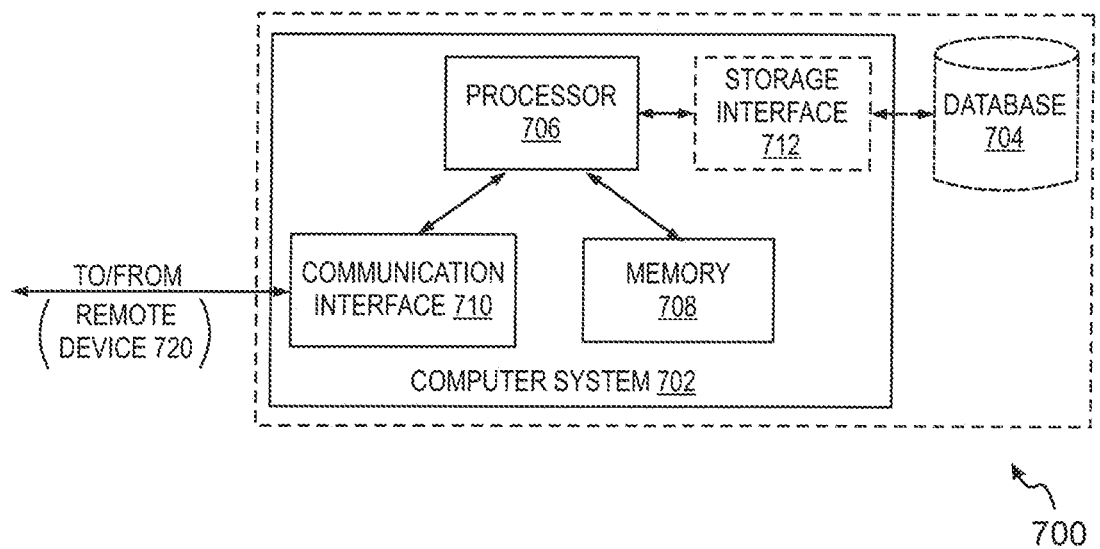
FIG. 7 is a simplified block diagram of a server system for facilitating payment transactions for online purchase orders in online traffic, in accordance with an embodiment of the present disclosure.

FIG. 7 is a simplified block diagram of a server system 700 for facilitating payment transactions for online purchase orders in online traffic, in accordance with an embodiment of the present disclosure. The server system 700 is an example of a server system (e.g., the payment server 114). The server system 700 includes a computer system 702 and a database 704.

The computer system 702 includes at least one processor 706 configured to execute executable instructions for providing various features of the present disclosure. The executing instructions are stored in a memory 708. The components of the computer system 702 provided herein may not be exhaustive and that the computer system 702 may include more or fewer components than that of depicted in FIG. 7. Further, two or more components may be embodied in one single component, and/or one component may be configured using multiple sub-components to achieve the desired functionalities. Some components of the computer system 702 may be configured using hardware elements, software elements, firmware elements and/or a combination thereof.

The processor 706 is operatively coupled to a communication interface 710 such that computer system 702 is capable of communicating with a remote device 720 such as the electronic device 104, the merchant server 110, or communicates with any entity connected to the network 108 (shown in FIG. 1) or any constituents of the payment network. In an embodiment, the communication interface 710 is configured to receive a request from a merchant server (e.g., the merchant server 110 in FIG. 1) for generation of an OTP corresponding to a payment transaction of a purchase order of the customer 102. Further, the communication interface 710 facilitates provision of the OTP to the merchant server upon receipt of the request. Moreover, the communication interface 710 may receive a payment transaction request along with a merchant OTP and a customer OTP from the remote device 720. The communication may be achieved through API calls, without loss of generality.

The processor 706 may also be operatively coupled to the database 704. The database 704 is any computer-operated hardware suitable for storing and/or retrieving data, such as, but not limited to, information of the customer 102, OTP provided to the merchant server, OTP provided by the customer 102 in the merchant interface 106, transaction data generated as part of sales activities conducted over the bankcard network including data relating to merchants, payees, or customers, and purchases. The database 704 may also store information related to a plurality of bank accounts of customers. Each user account data includes at least one of a cardholder name, a cardholder address, an account number, MPIN, and other account identifier. The database 704 may also include instructions for settling transactions including merchant bank account information. The database 704 may include multiple storage units such as hard disks and/or solid-state disks in a redundant array of inexpensive disks (RAID) configuration. The database 704 may include a storage area network (SAN) and/or a network attached storage (NAS) system.

In some embodiments, the database 704 is integrated within computer system 702. For example, the computer system 702 may include one or more hard disk drives as the database 704. In other embodiments, the database 704 is external to the computer system 702 and may be accessed by the computer system 702 using a storage interface 712. The storage interface 712 is any component capable of providing the processor 706 with access to the database 704. The storage interface 712 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 706 with access to the database 704.

The processor 706 is configured to facilitate a payment transaction from an issuer account of a customer (e.g., the customer 102) to an acquirer account (a merchant or a payee account). The processor 706 is configured to perform one or more of the functions such as: facilitate provision of an OTP to a merchant server, provision the OTP to the customer for locking a purchase order of the customer, receive the OTP from the merchant server and the customer corresponding to a payment transaction of the purchase order, validate the OTP received the merchant server and the customer and facilitate the payment transaction for the purchase order.

Figure 8:
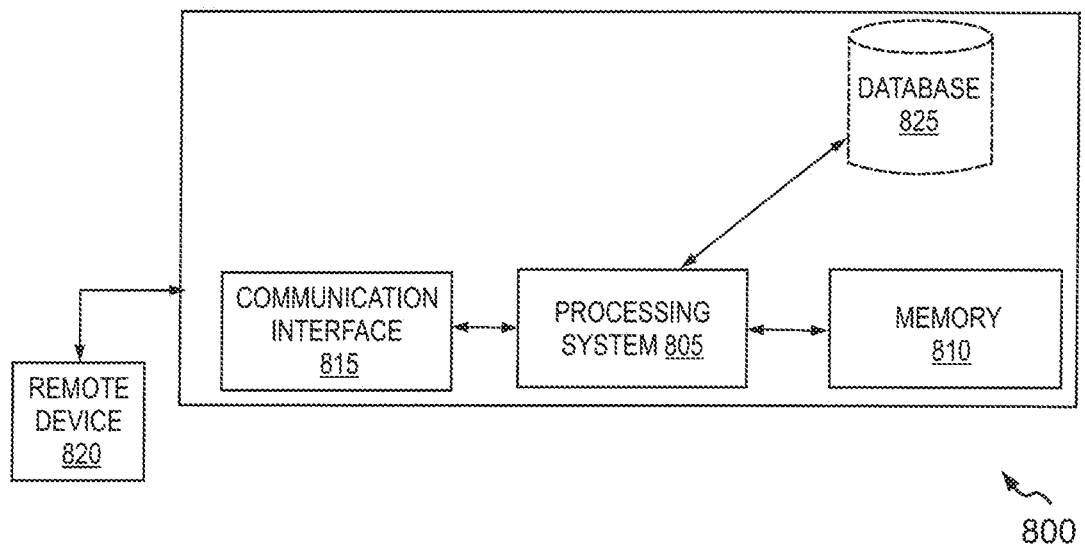
FIG. 8 is a simplified block diagram of a payment server for facilitating payment transactions for online purchase orders, in accordance with an example embodiment of the present disclosure.

FIG. 8 is a simplified block diagram of a payment server 800 used for facilitating payment transactions for online purchase orders in online traffic, in accordance with an example embodiment of the present disclosure. The payment server 800 is an example of the payment server 114 of FIG. 1. The network 108 may be used as a payment network by the payment server 800, the merchant server 900 and the issuer server 1000 as a payment interchange network. Examples of payment interchange network include, but not limited to, Mastercard® payment system interchange network. The payment server 800 includes a processing system 805 configured to extract programming instructions from a memory 810 to provide various features of the present disclosure. The components of the payment server 800 provided herein may not be exhaustive and that the payment server 800 may include more or fewer components than that of depicted in FIG. 8. Further, two or more components may be embodied in one single component, and/or one component may be configured using multiple sub-components to achieve the desired functionalities. Some components of the payment server 800 may be configured using hardware elements, software elements, firmware elements and/or a combination thereof.

The communication interface 815 is configured to receive a request from a remote device 820, such as the merchant server 110, the acquirer server 112, the issuer server 116 or the electronic device 104. More specifically, the communication interface 815 is configured to receive a request for generating an OTP corresponding to a payment transaction of an online purchase order in a merchant interface 106. The request is provided to the processing system 805 via the communication interface 815.

The processing system 805 is configured to generate the OTP upon receipt of the request. Further, the communication interface 815 is configured to receive a payment transaction request from the merchant server 110 via the acquirer server 112. The communication may be achieved through API calls, without loss of generality. The payment server 800 includes a database 825 for storing information of the merchant site and the customer 102 by the processing system 805.

Figure 9:
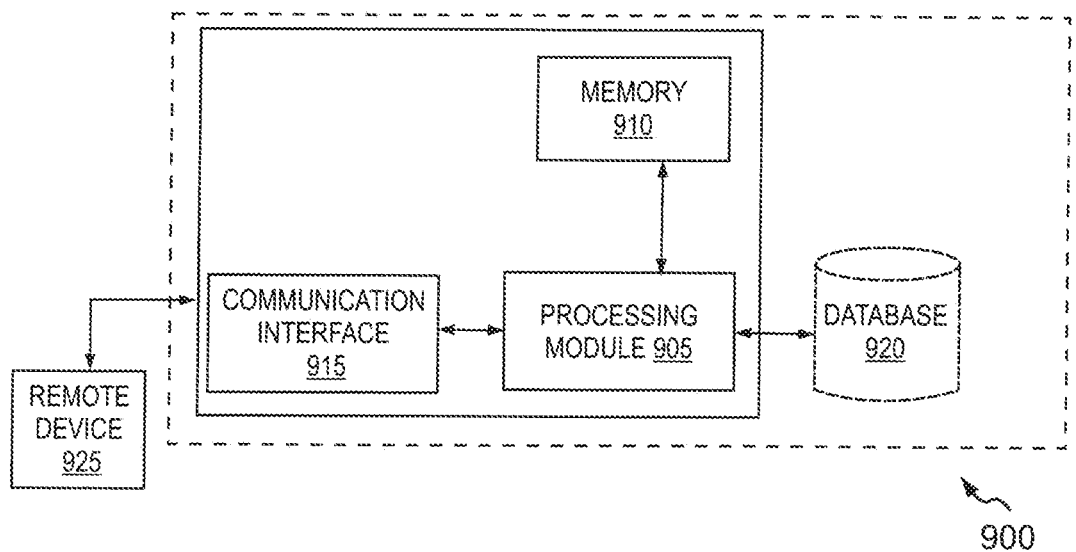
FIG. 9 is a simplified block diagram of a merchant server used for hosting a merchant site for facilitating online purchasing to customers, in accordance with an example embodiment of the present disclosure.

FIG. 9 is a simplified block diagram of a merchant server 900 used for hosting a merchant site for facilitating online purchasing to customers, in accordance with an example embodiment of the present disclosure. The merchant server 900 is associated with a merchant site, which may be associated with a merchant. The merchant server 900 is an example of the merchant server 110 of FIG. 1 or may be embodied in the merchant server 110. Further, the merchant server 900 is configured to facilitate advertisement of goods/services for sale to the customers using a network, such as the network 108 of FIG. 1.

The merchant server 900 includes a processing module 905 configured to extract programming instructions from a memory 910. The processing module 905 is further communicably coupled to a communication interface 915 and a database 920. The components of the merchant server 900 provided herein may not be exhaustive, and that the merchant server 900 may include more or fewer components than that of depicted in FIG. 9. Further, two or more components may be embodied in one single component, and/or one component may be configured using multiple sub-components to achieve the desired functionalities. Some components of the merchant server 900 may be configured using hardware elements, software elements, firmware elements and/or a combination thereof.

In one embodiment, the processing module 905 is configured to receive an online purchase order from the remote device 925, such as the merchant interface 106 or the electronic device 104. The processing module 905 is further configured to send a request to the server system 700 of FIG. 7 for generating an OTP upon receipt of the online purchase order. The processing module 905 receives the purchase order through the communication interface 915.

In an embodiment, the communication interface 915 is capable of facilitating operative communication with a remote device 925, such as, the merchant interface 106 in the electronic device 104, acquirer server 112 or the payment server 114. The communication interface 915 is configured to receive online purchase order submission from the merchant interface 106 in the remote device 925 (e.g., the electronic device 104). The communication interface 915 is configured to send a request to the server system 700 for generating an OTP upon receipt of the online purchase order. The communication interface 915 is further configured to receive an OTP generated by the server system 700 of FIG. 7. The processing module is further configured to encrypt the OTP and generate the encrypted OTP as merchant OTP.

In another embodiment, the communication interface 915 is configured to retrieve a registered contact number of a customer from the database 920 for providing the OTP to the customer. Further, the communication interface 915 is configured to receive the OTP provided by the customer in the merchant interface 106. The processing module 905 is configured to encrypt the OTP provided by the customer to generate a customer OTP.

The database 920 includes data of the customers, such as, but not limited to, customer name, customer address, shipping address, contact number, and email id. Additionally, the database 920 is configured to store the merchant OTP and the customer OTP.

Figure 10:
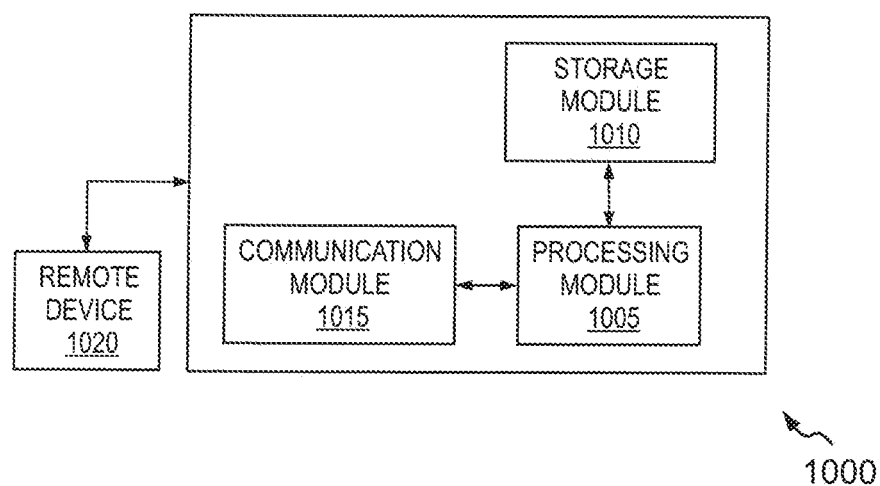
FIG. 10 is a simplified block diagram of an issuer server used for facilitating payment transactions of online purchase orders of customers, in accordance with an example embodiment of the present disclosure.

FIG. 10 is a simplified block diagram of an issuer server 1000 used for facilitating payment transactions of online purchase orders of customers, in accordance with an example embodiment of the present disclosure. The issuer server 1000 is an example of the issuer server 116 of FIG. 1, or may be embodied in the issuer server 116. The issuer server 1000 is associated with an issuer bank/issuer, in which a user (e.g., the customer 102) may have an account, which provides a payment card. The issuer server 1000 includes a processing module 1005 operatively coupled to a storage module 1010 and a communication module 1015. The components of the issuer server 1000 provided herein may not be exhaustive and that the issuer server 1000 may include more or fewer components than that of depicted in FIG. 10. Further, two or more components may be embodied in one single component, and/or one component may be configured using multiple sub-components to achieve the desired functionalities. Some components of the issuer server 1000 may be configured using hardware elements, software elements, firmware elements and/or a combination thereof.

The storage module 1010 is configured to store machine executable instructions to be accessed by the processing module 1005. Additionally, the storage module 1010 stores information related to, contact information of the user, bank account number, availability of funds in the account, payment card details, transaction details and/or the like. Further, the storage module 1010 is configured to store a merchant OTP and a customer OTP. The merchant OTP is obtained from the payment transaction request received from the server system 700 described in FIG. 7. The customer OTP is received from the merchant server 900 described in FIG. 9.

The processing module 1005 is configured to communicate with one or more remote devices such as a remote device 1020 using the communication module 1015 over a network such as the network 108 of FIG. 1. The examples of the remote device 1020 include the electronic device 104, the merchant interface 106, the merchant server 110, the acquirer server 112, the payment server 114 or other computing systems of issuer and the network 108 and the like. The communication module 1015 is capable of facilitating such operative communication with the remote devices and cloud servers using API (Application Program Interface) calls. The communication module 1015 is configured to receive a payment transaction request from a merchant interface (e.g., the merchant interface 106) in the electronic device 104 via the network 108. The processing module 1005 receives a payment card information, a payment transaction amount, a customer information and merchant information from the merchant interface 106 in remote device 1020 (such as the electronic device 104 or the payment server 114).

Figure 11:
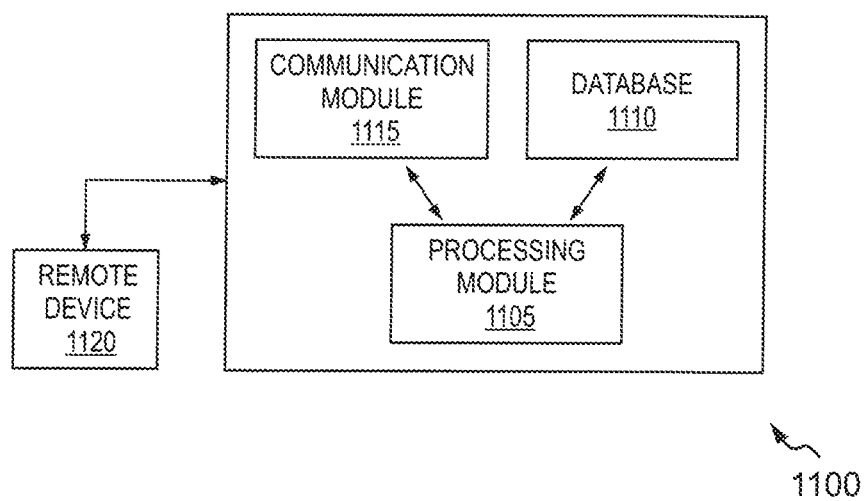
FIG. 11 is a simplified block diagram of an acquirer server used for facilitating payment transactions of the online purchase orders to the merchant site, in accordance with an example embodiment of the present disclosure.

FIG. 11 is a simplified block diagram of an acquirer server 1100 used for facilitating payment transactions of the online purchase orders to the merchant site, in accordance with an example embodiment of the present disclosure. The acquirer server 1100 is associated with an acquirer bank, which may be associated with the merchant. The merchant may have established an account to accept payment for purchase of items from users. The acquirer server 1100 is an example of the acquirer server 112 of FIG. 1 or may be embodied in the acquirer server 112. Further, the acquirer server 1100 is configured to facilitate payment with the issuer server 1000 using a payment network, such as the network 108 of FIG. 1.

The acquirer server 1100 includes a processing module 1105 communicably coupled to a database 1110 and a communication module 1115. The components of the acquirer server 1100 provided herein may not be exhaustive, and that the acquirer server 1100 may include more or fewer components than that of depicted in FIG. 11. Further, two or more components may be embodied in one single component, and/or one component may be configured using multiple sub-components to achieve the desired functionalities. Some components of the acquirer server 1100 may be configured using hardware elements, software elements, firmware elements and/or a combination thereof.

The database 1110 includes data of one or more merchant parameters, such as, but not limited to, a merchant primary account number (PAN), a merchant name, a merchant ID (MID), a merchant category code (MCC), a merchant city, a merchant postal code, a merchant brand name, etc., used for processing transactions. The processing module 1105 is configured to use the MID or any other merchant parameter such as the merchant PAN to identify the merchant during the normal processing of payment transactions, refunds, adjustments, chargebacks, end-of-month fees, loyalty programs associated with the merchant and so forth. The processing module 1105 may be configured to store and update the merchant parameters in the database 1110 for later retrieval. In an embodiment, the communication module 1115 is capable of facilitating operative communication with a remote device 1120, such as, the electronic device 104 with the merchant interface 106. The communication module 1115 is configured to receive the payment transaction request from the merchant interface 106 in the remote device 1120 (e.g., the electronic device 104).

Figure 12:
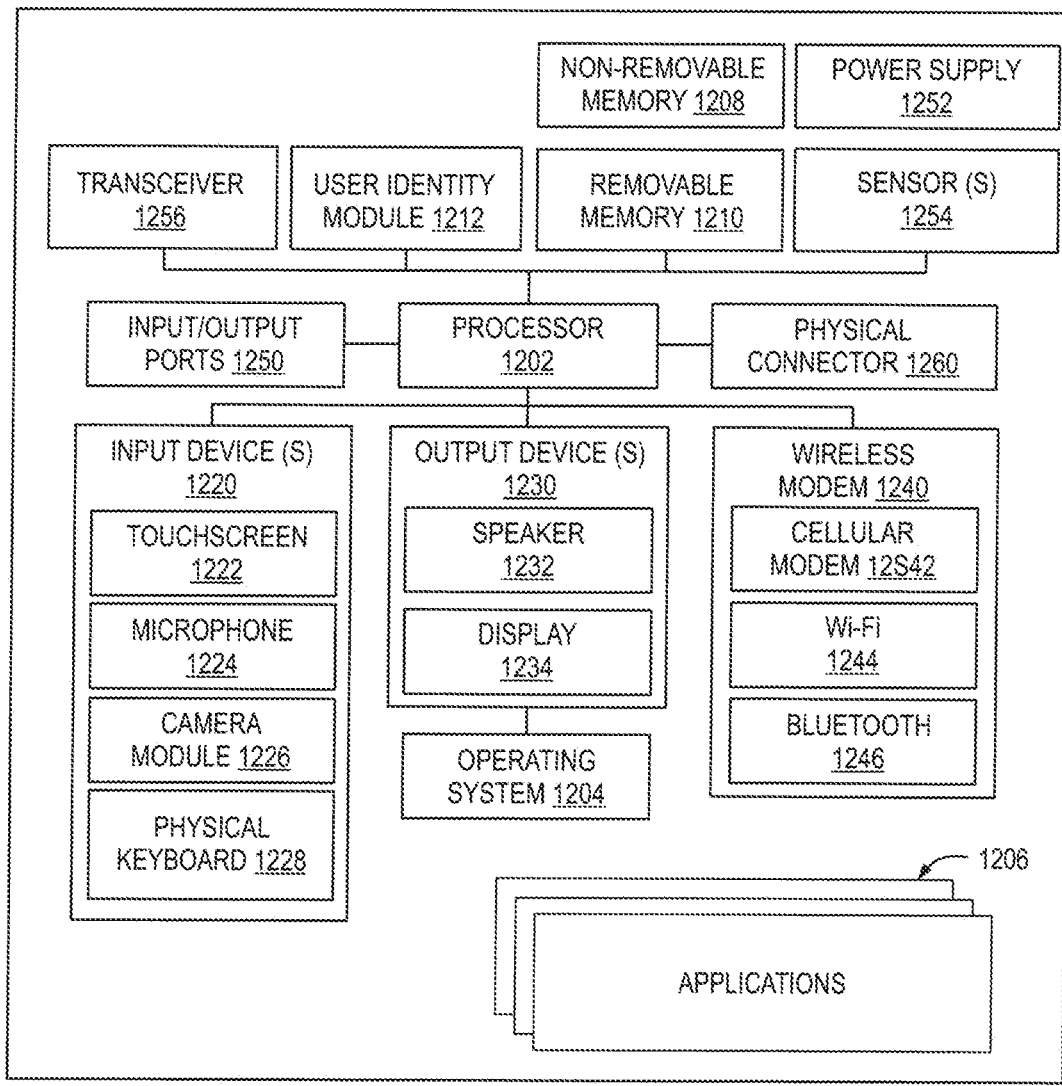
FIG. 12 shows simplified block diagram of an electronic device, in accordance with an example embodiment of the present disclosure.

FIG. 12 shows simplified block diagram of an electronic device 1200, for example, a mobile phone capable of implementing the various embodiments of the present disclosure. The electronic device 1200 is depicted to include one or more applications 1206. The electronic device 1200 is an example of the electronic device 104.

It should be understood that the electronic device 1200 as illustrated and hereinafter described is merely illustrative of one type of device and should not be taken to limit the scope of the embodiments. As such, it should be appreciated that at least some of the components described below in connection with that the electronic device 1200 may be optional and thus in an example embodiment may include more, less or different components than those described in connection with the example embodiment of the FIG. 12. As such, among other examples, the electronic device 1200 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the electronic device 1200 and support for one or more applications programs (see, applications 1206), such as a merchant interface 106 for facilitating online purchase order to a customer (e.g., the customer 102 of FIG. 1), receiving an OTP for locking the online purchase order, locking of the online purchase order by providing OTP in the merchant interface 106 or facilitating the payment transaction for the online purchase order using the OTP.

In addition to the application interface, the applications 1206 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 1200 includes one or more memory components, for example, anon-removable memory 1208 and/or a removable memory 1210. The non-removable memory 1208 and/or the removable memory 1210 may be collectively known as database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. The electronic device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1200 can support one or more input devices 1220 and one or more output devices 1230. Examples of the input devices 1220 may include, but are not limited to, a touch screen/a screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited to a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the electronic device 1200 and a public switched telephone network (PSTN).

The electronic device 1200 can further include one or more input/output ports 1250 for establishing connection with peripheral devices including a power supply 1252, one or more sensors 1254 for example, an accelerometer, a gyroscope, a compass, or an infrared proximity sensor for detecting the orientation or motion of the electronic device 1200 and biometric sensors for scanning biometric identity of an authorized user, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

With the application (see, the applications 1206) and/or other software or hardware components, the electronic device 1200 can implement the technologies described herein. For example, the processor 1202 can cause generation of one or more UIs for displaying order check out page, order confirmation page and order shipment page for a locked online purchase order.

The disclosed methods with reference to FIGS. 1 to 12, or one or more operations of the flow diagrams described herein may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 700 (e.g. payment server 114) and its various components such as the computer system 702 and the database 704 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method, comprising:
receiving, by a server system via a merchant interface, an online purchase request from an electronic device associated with a customer, the online purchase request comprising payment related information of a payment card associated with the customer for purchasing at least one item at a set price;
determining that current online traffic is greater than a threshold traffic level;
responsive to determining that the current online traffic is greater than the threshold traffic level, sending a One-Time Password (OTP) request to a payment server associated with a payment network;
receiving an OTP from the payment server;
storing the OTP as a merchant OTP in a database accessible to the server system;
facilitating sending the OTP to a registered contact identifier of the customer;
providing an option to the customer to input a customer OTP in the merchant interface; and
upon receipt of the customer OTP from the customer, locking, responsive to the current online traffic and prior to submitting a payment transaction using the payment related information, an online purchase order of at least one item for the set price, wherein the payment transaction from the payment card is initiated after online traffic is less than the threshold traffic level.

2. The method as claimed in claim 1, wherein the the at least one item is offered for sale at the set price which is less than a standard price of the at least one item, and when an increased online traffic is expected at the server system.

3. The method as claimed in claim 2, further comprising facilitating the payment transaction after the sale at the set price.

4. The method as claimed in claim 3, wherein facilitating the payment transaction comprises:
sending a payment transaction request and the merchant OTP to the payment server, wherein the payment server sends the payment transaction request and the merchant OTP to an issuer server associated with the payment card;
sending the customer OTP to the issuer server, and
receiving, upon validation of the customer OTP and the merchant OTP, a notification of payment confirmation from the payment server.

5. The method as claimed in claim 3, wherein the validation of the customer OTP and the merchant OTP comprises a determination of whether the customer OTP and the merchant OTP are matching.

6. The method as claimed in claim 4, upon failed validation, sending a notification requesting one or more alternate payment options to complete the payment transaction.

7. The method as claimed in claim 1, wherein the registered contact identifier is a registered contact number of the customer, and wherein facilitating sending the OTP comprising sending the OTP via Short Message Service (SMS) to the registered contact number of the customer.

8. The method as claimed in claim 1, wherein the registered contact identifier is a registered Email Identifier (Email ID) of the customer, and wherein facilitating sending the OTP comprising sending the OTP in form of an Email to the Email ID of the customer.

9. The method as claimed in claim 1, wherein storing the OTP as the merchant OTP comprises encrypting the OTP with a public key of an issuer server associated with the payment card.

10. The method as claimed in claim 1, wherein encrypting the OTP provided to the customer comprises:
encrypting the OTP using a public key of an issuer of the payment card; and
storing the customer OTP for the payment transaction.

11. The method as claimed in claim 4, wherein sending the customer OTP further comprises encrypting the customer OTP.

12. The method as claimed in claim 1, further comprising sending a notification in the merchant interface, wherein the merchant interface is accessible via an application installed in the electronic device of the customer, wherein the notification comprises one or more of: a notification that online purchase order is locked, a notification of completion of the payment transaction, and a notification of failure of payment transaction, and a notification to use an alternate payment option in case of failure of payment transaction.

13. A server system, comprising:
a memory comprising stored instructions; and
a processor configured to execute the stored instructions to cause the server system to:
receive, via a merchant interface, an online purchase request from an electronic device associated with a customer, the online purchase request comprising payment related information of a payment card associated with the customer for purchasing at least one item at a set price;
determine that current online traffic is greater than a threshold traffic level;
responsive to the determination that the current online traffic is greater than the threshold traffic level, send a One-Time Password (OTP) request to a payment server associated with a payment network;
receive an OTP from the payment server;
store the OTP as a merchant OTP in a database accessible to the server system; facilitate a send of the OTP to a registered contact identifier of the customer; provide an option to the customer to input a customer OTP in the merchant interface; and
upon receipt of the customer OTP from the customer, lock, responsive to the current online traffic and prior to submission of a payment transaction using the payment related information, an online purchase order of at least one item for the set price, wherein a payment transaction from the payment card is initiated after online traffic is less than the threshold traffic level.

14. The server system as claimed in claim 13, wherein the the at least one item is offered for sale at the set price which is less than a standard price of the at least one item, and when an increased online traffic is expected at the server system.

15. The server system as claimed in claim 14, wherein the server system is further caused to facilitate the payment transaction after the sale at the set price.

16. The server system as claimed in claim 13, wherein to facilitate the payment transaction, the server system is caused to:
   send a payment transaction request and the merchant OTP to the payment server, wherein the payment server sends the payment transaction request and the merchant OTP to an issuer server associated with the payment card;
   send the customer OTP to the issuer server; and
   receive a notification of payment confirmation from the payment server, upon validation of the customer OTP and the merchant OTP.

17. The server system as claimed in claim 13, wherein the validation of the customer OTP and the merchant OTP comprises a determination of whether the customer OTP and the merchant OTP are matching.

18. A method, comprising:
   receiving, by a server system via a merchant interface, an online purchase request from an electronic device associated with a customer, the online purchase request comprising payment related information of a payment card associated with the customer for purchasing at least one item at a set price;
   determining a current online traffic at the server system;
   upon the current online traffic being greater than a threshold traffic level, sending a One-Time Password (OTP) request to a payment server associated with a payment network;
   receiving an OTP from the payment server;
   storing the OTP as a merchant OTP in a database accessible to the server system; facilitating sending the OTP to a registered contact identifier of the customer;
   providing an option to the customer to input a customer OTP in the merchant interface;
   upon receipt of the customer OTP from the customer, locking, responsive to the current online traffic and prior to submitting a payment transaction using the payment related information, an online purchase order of the at least one item for the set price; and
   transmitting a request comprising the payment related information to initiate processing of the payment transaction for the locked online purchase order after online traffic is less than the threshold traffic level, wherein processing of the payment transaction comprises validating the merchant OTP and the customer OTP provided as input by the customer.

* * * * *